United States Patent
Haddock

(10) Patent No.: US 9,882,838 B2
(45) Date of Patent: *Jan. 30, 2018

(54) FORWARDING INTER-SWITCH CONNECTION (ISC) FRAMES IN A NETWORK-TO-NETWORK INTERCONNECT TOPOLOGY

(71) Applicant: Extreme Networks, Inc., San Jose, CA (US)

(72) Inventor: Stephen R. Haddock, Los Gatos, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/242,633

(22) Filed: Aug. 22, 2016

(65) Prior Publication Data

US 2016/0359767 A1 Dec. 8, 2016

Related U.S. Application Data

(63) Continuation of application No. 14/508,517, filed on Oct. 7, 2014, now Pat. No. 9,455,934, which is a (Continued)

(51) Int. Cl.
 *H04L 12/28* (2006.01)
 *H04L 12/933* (2013.01)
 (Continued)

(52) U.S. Cl.
 CPC .......... *H04L 49/15* (2013.01); *H04L 12/4633* (2013.01); *H04L 45/58* (2013.01); *H04L 49/253* (2013.01); *H04L 45/12* (2013.01)

(58) Field of Classification Search
 None
 See application file for complete search history.

(56) References Cited

U.S. PATENT DOCUMENTS

| 5,825,203 A | 10/1998 | Kusunoki et al. |
| 8,730,963 B1 | 5/2014 | Grosser, Jr. et al. |

(Continued)

OTHER PUBLICATIONS

A framework for defining an IEEE 802.1 NNI, by Norman Finn, downloaded from http://www.ieee802.org/1 /files/public/docs201 0/new-nfinn-nni-framework-011 O-v01.pdf on Mar. 8, 2011, 21 pages.

(Continued)

*Primary Examiner* — Zewdu A Beyen
(74) *Attorney, Agent, or Firm* — Haley Guiliano LLP

(57) ABSTRACT

Systems, mechanisms, apparatuses, and methods are disclosed for forwarding Inter-Switch Connection (ISC) frames in a Network-to-Network Interconnect (NNI) topology, for example, via a network switch which includes a first physical switch port to receive a physical switch link from a second network switch; logic to implement a first logical ISC and a second logical ISC' connection to the second network switch via the physical switch link; a second physical switch port to receive an interface connection from a third network switch; and switch forwarding logic to forward frames received at the first network switch to the second network switch via the logical ISC or logical ISC' based on whether or not the physical switch link is part of an active topology upon which the network switch operates or is not part of the active topology upon which the network switch operates. Other embodiments are disclosed.

20 Claims, 13 Drawing Sheets

Related U.S. Application Data continuation of application No. 13/220,516, filed on Aug. 29, 2011, now Pat. No. 8,855,124.

(60) Provisional application No. 61/451,515, filed on Mar. 10, 2011.

(51) Int. Cl.
    *H04L 12/46* (2006.01)
    *H04L 12/775* (2013.01)
    *H04L 12/937* (2013.01)
    *H04L 12/721* (2013.01)

(56) References Cited

U.S. PATENT DOCUMENTS

| | | | |
|---|---|---|---|
| 2002/0109879 A1* | 8/2002 | Wing So | H04J 7/00 398/58 |
| 2009/0274153 A1 | 11/2009 | Kuo et al. | |
| 2012/0063312 A1 | 3/2012 | Sarwar et al. | |
| 2012/0177041 A1* | 7/2012 | Berman | H04L 12/4625 370/392 |
| 2012/0250499 A1 | 10/2012 | Osswald et al. | |

OTHER PUBLICATIONS

Buffer Networks: A Paradigm for Employing NNis, from IEEE 802.1 plenary, dated Mar. 2010, 22 pages.

Non-Final Office Action for U.S. Appl. No. 13/220,520, dated Nov. 22, 2013, 30 pages.

Resilient Network Interconnect using Distributed Link Aggregation Vs. 3b, by Stephen Haddock, dated Sep. 16, 2010, 40 pages.

Split Multi-link Trunking (SMLT) draft-lapuh-network-smlt-08, by Roger Lapuh et al., from the Internet-Draft Network Working Group, dated Jul. 7, 2008, 15 pages.

U.S. Appl. No. 13/220,520 titled "Forwarding Inter-Switch Connection (ISC) Frames in a Network-To-Network Interconnect Topology," filed on Aug. 29, 2011, 70 pages.

Why LACP for the NNI protocol? by Norman Finn, downloaded from http://www.ieee802.org/1/files/public/docs2011 /new-nfinn-why-LACP-for-NNII-0111- v01.pdf on Jun. 27, 2011, 11 pages.

* cited by examiner

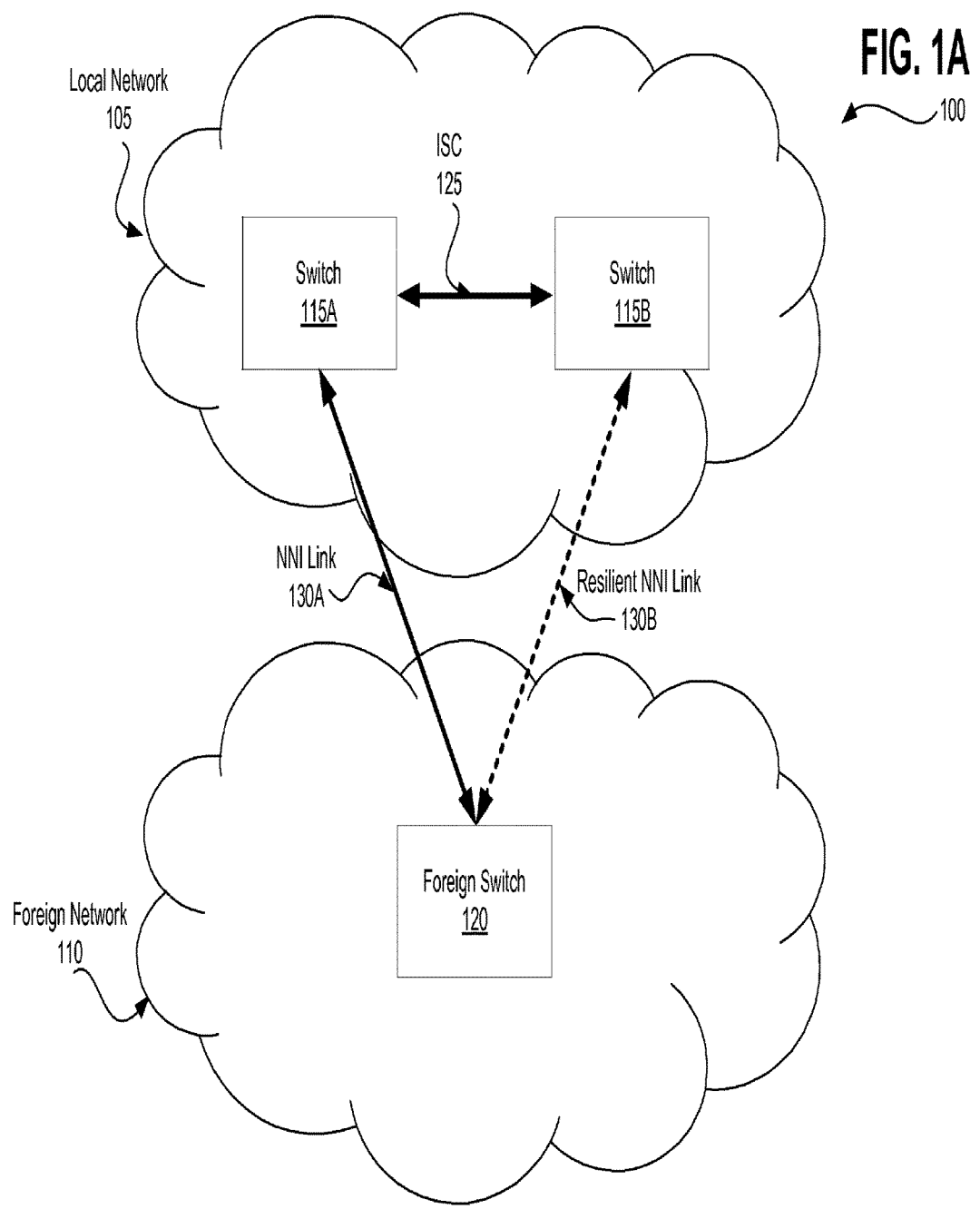

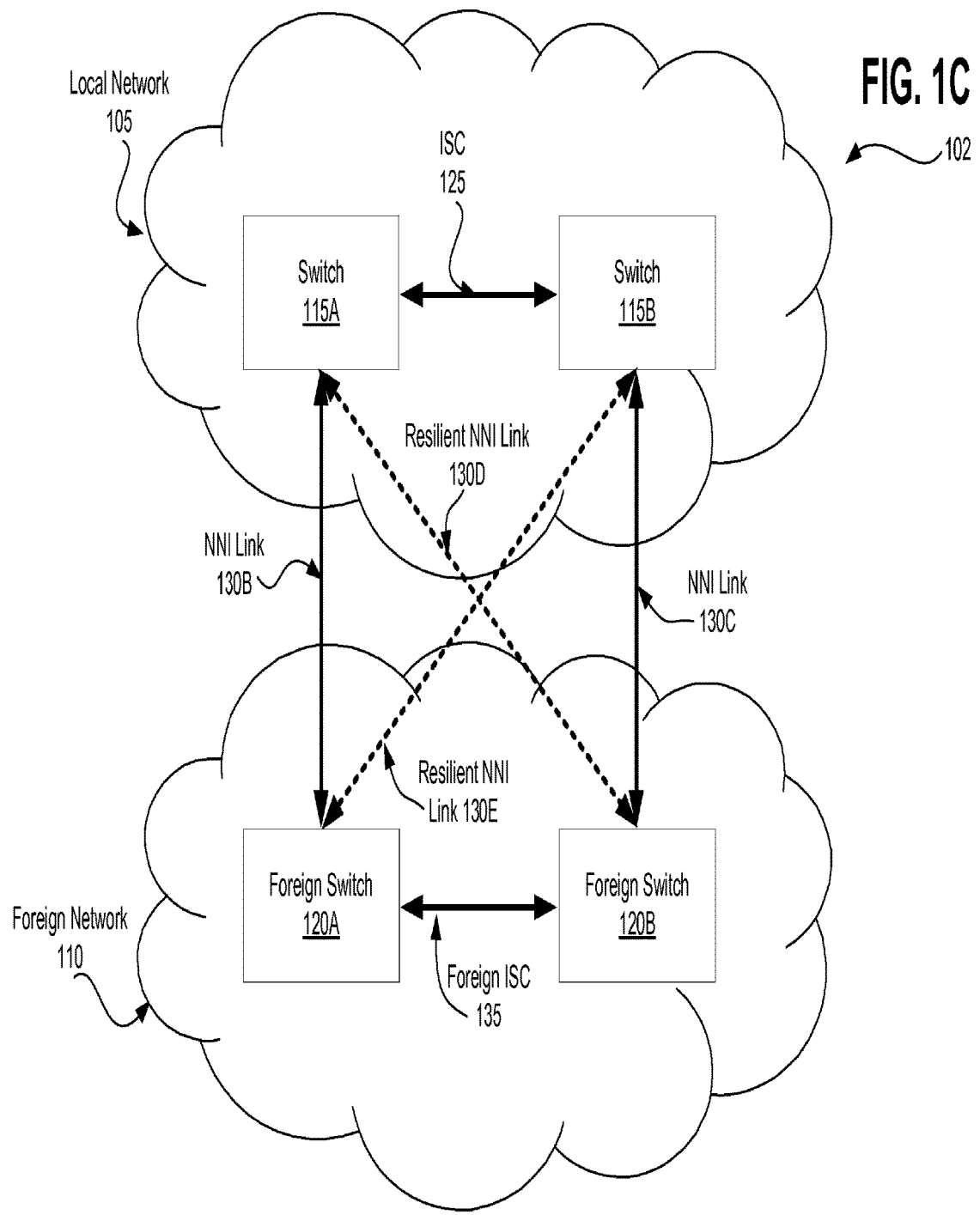

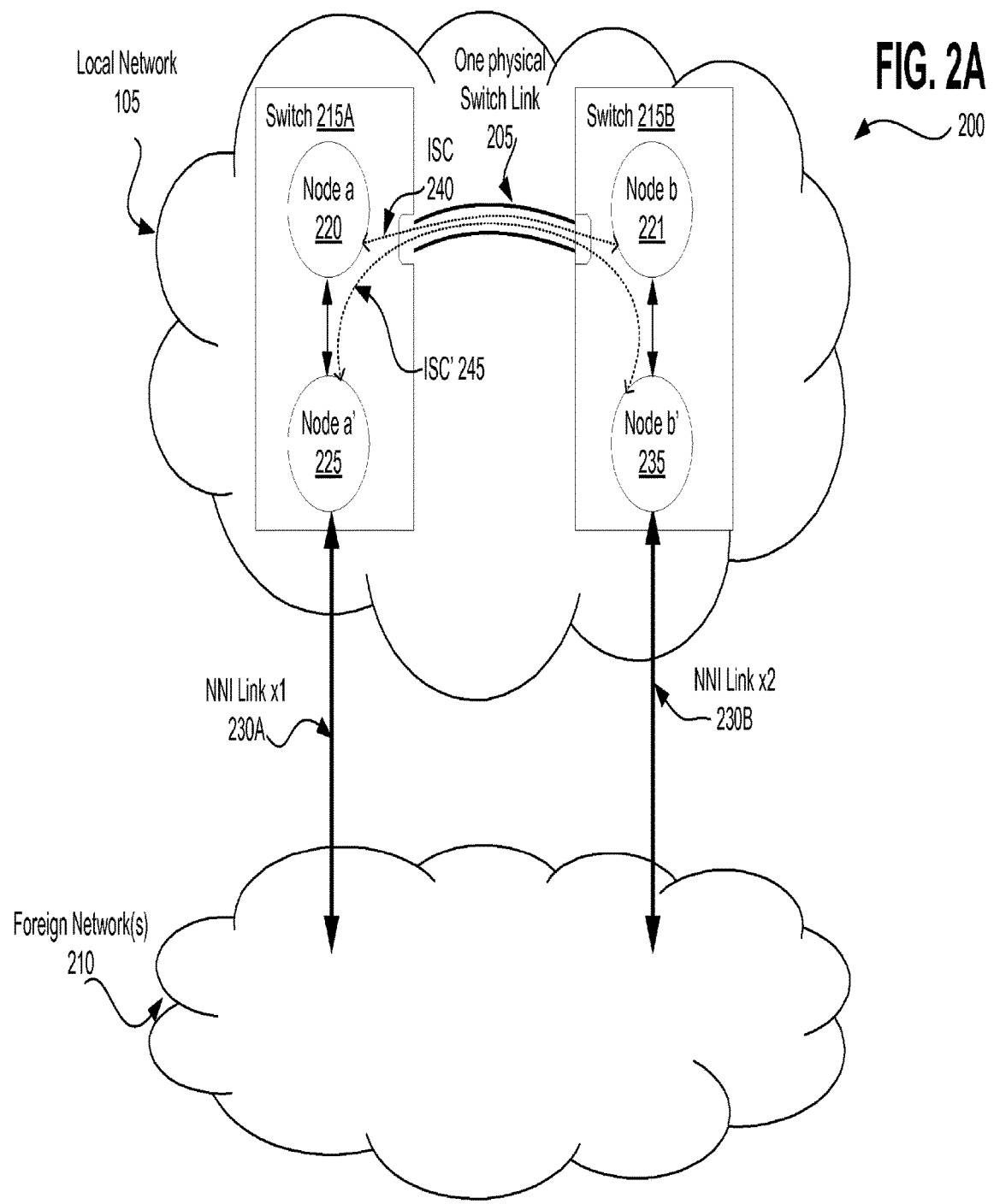

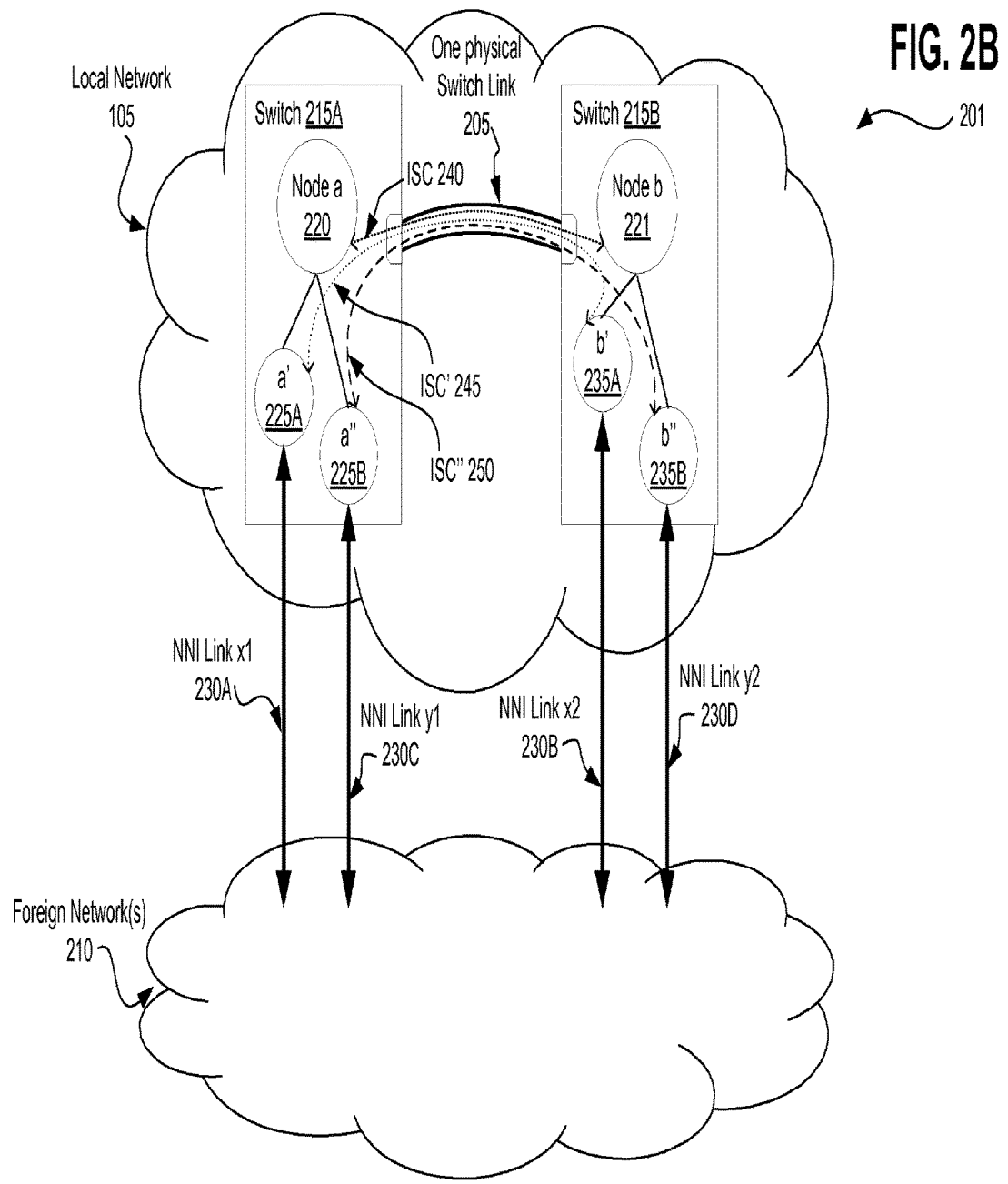

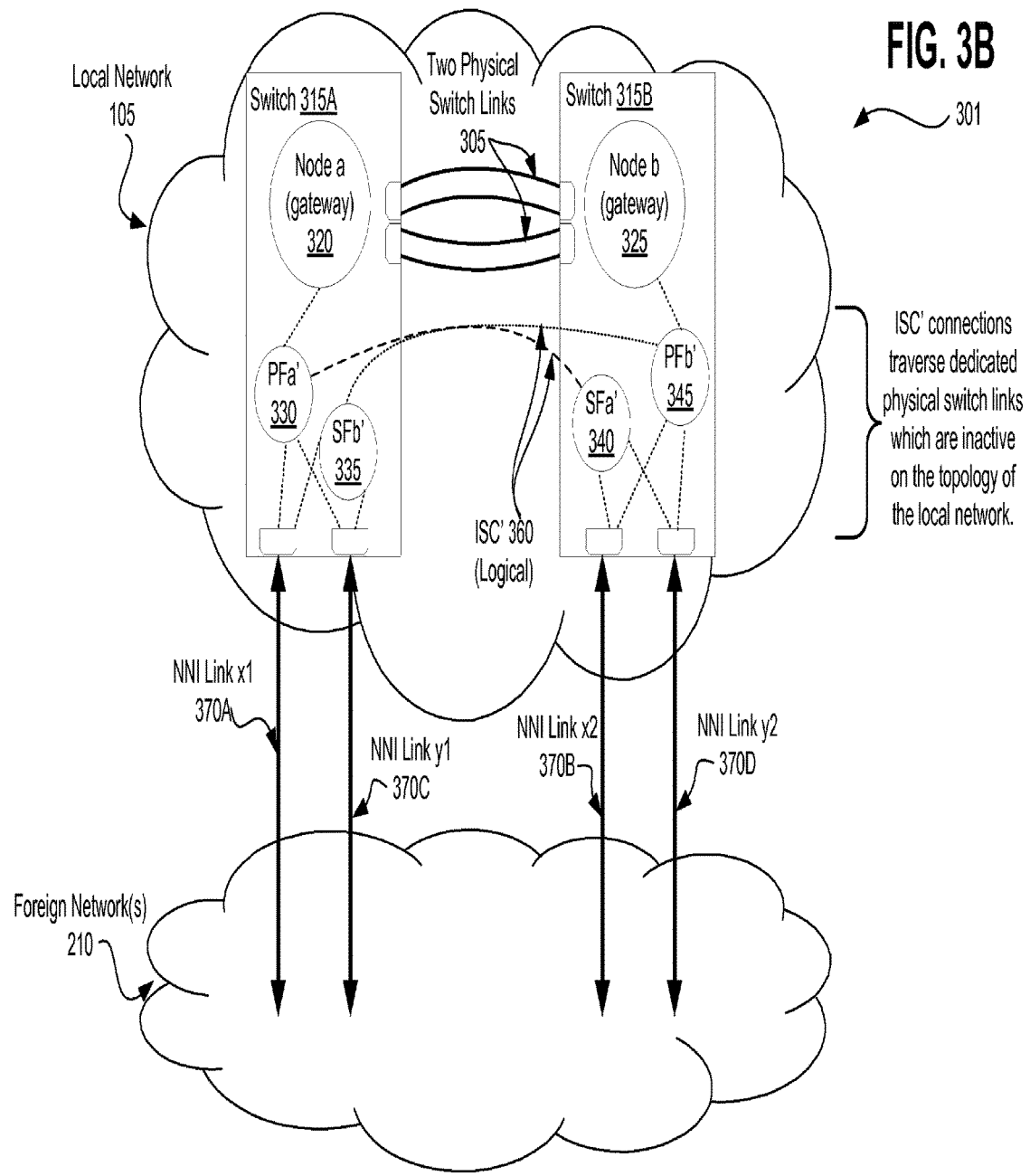

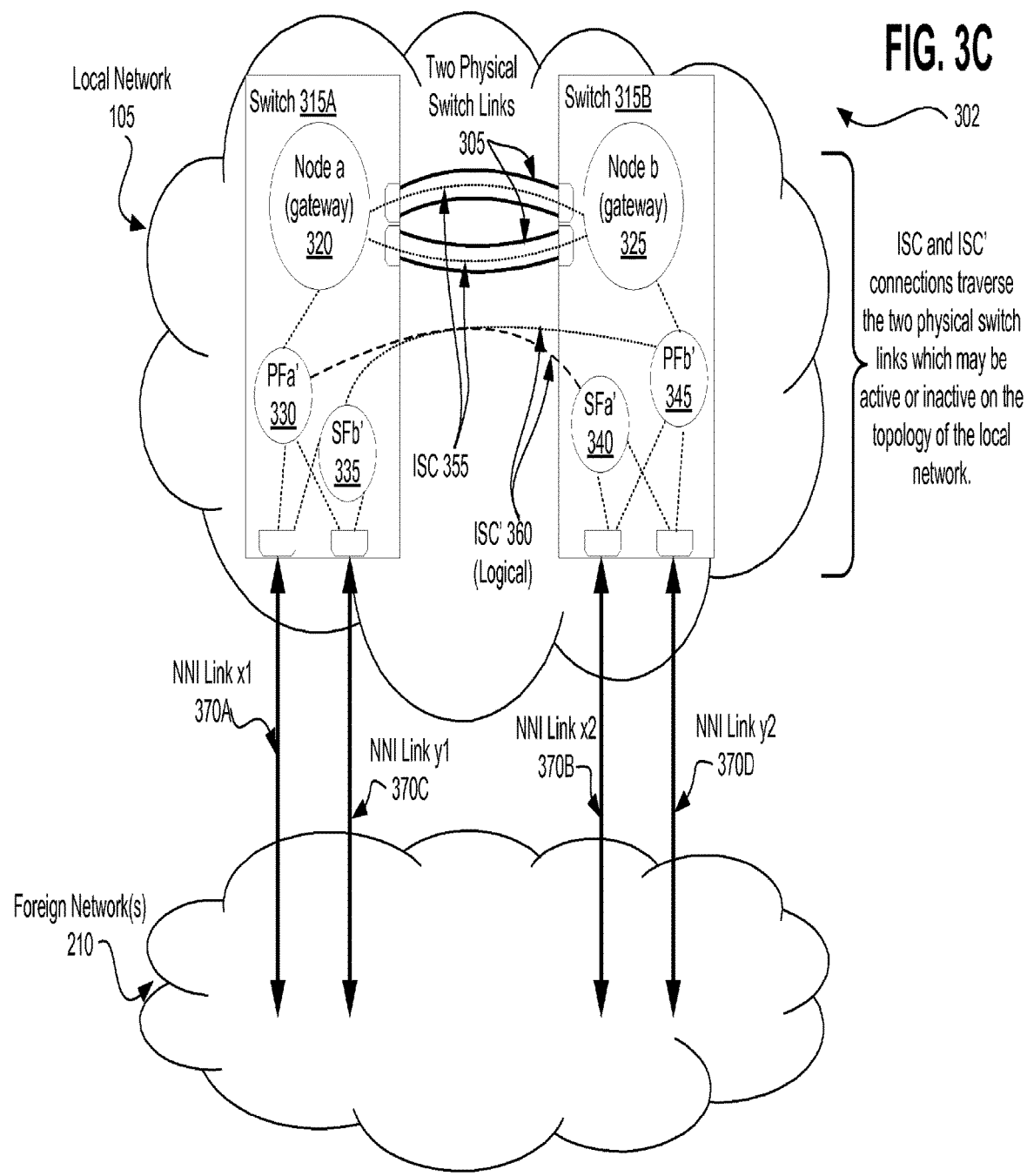

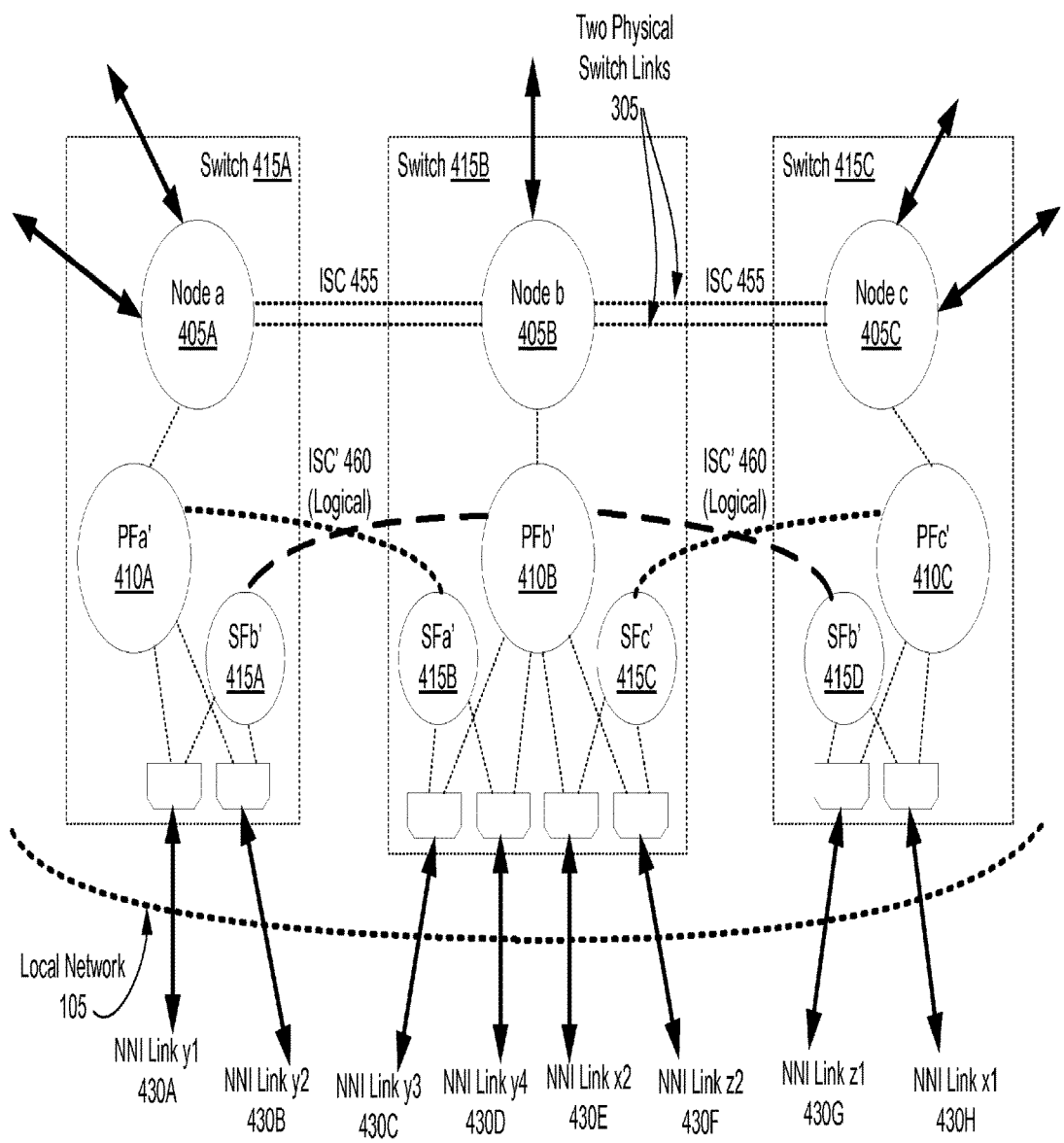

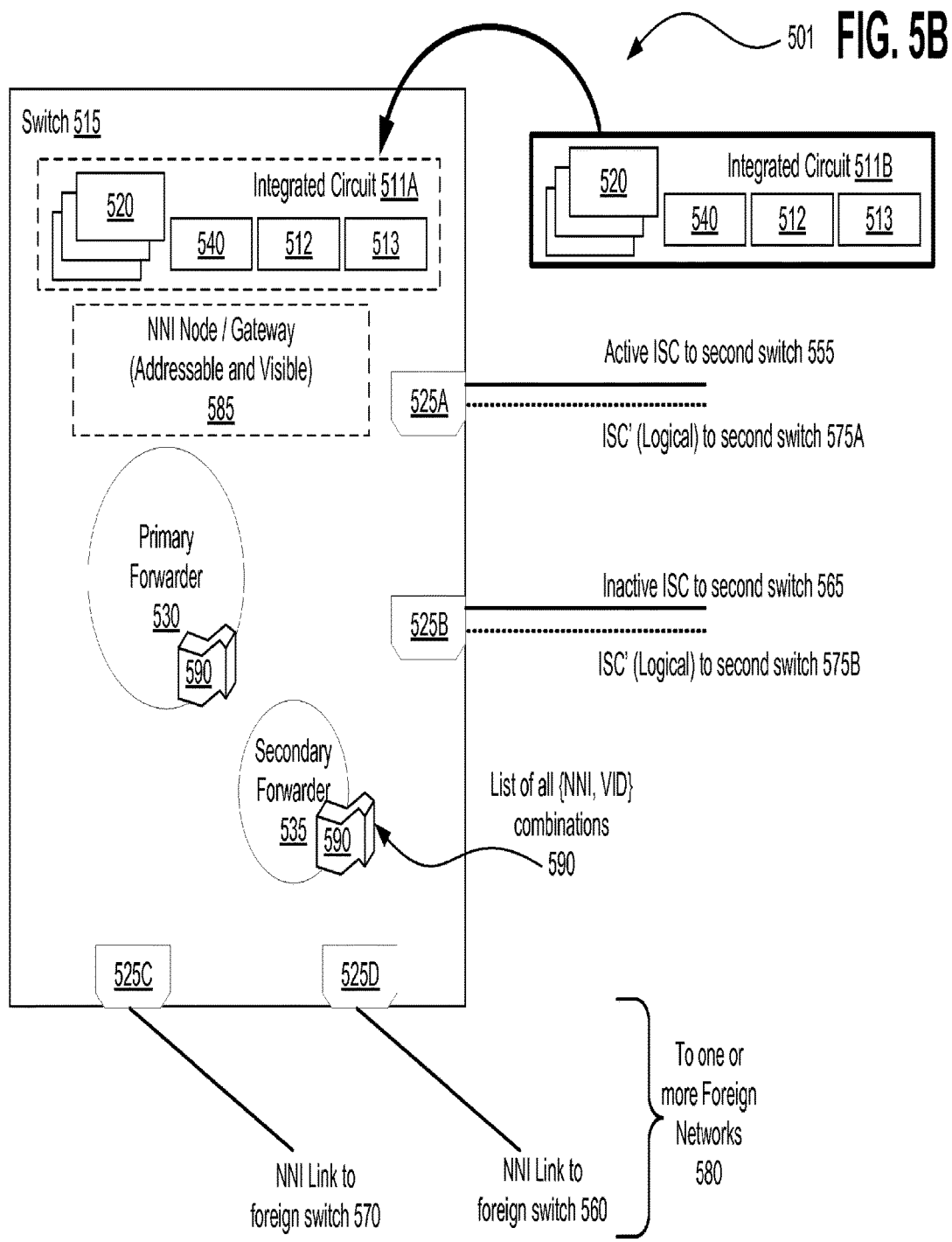

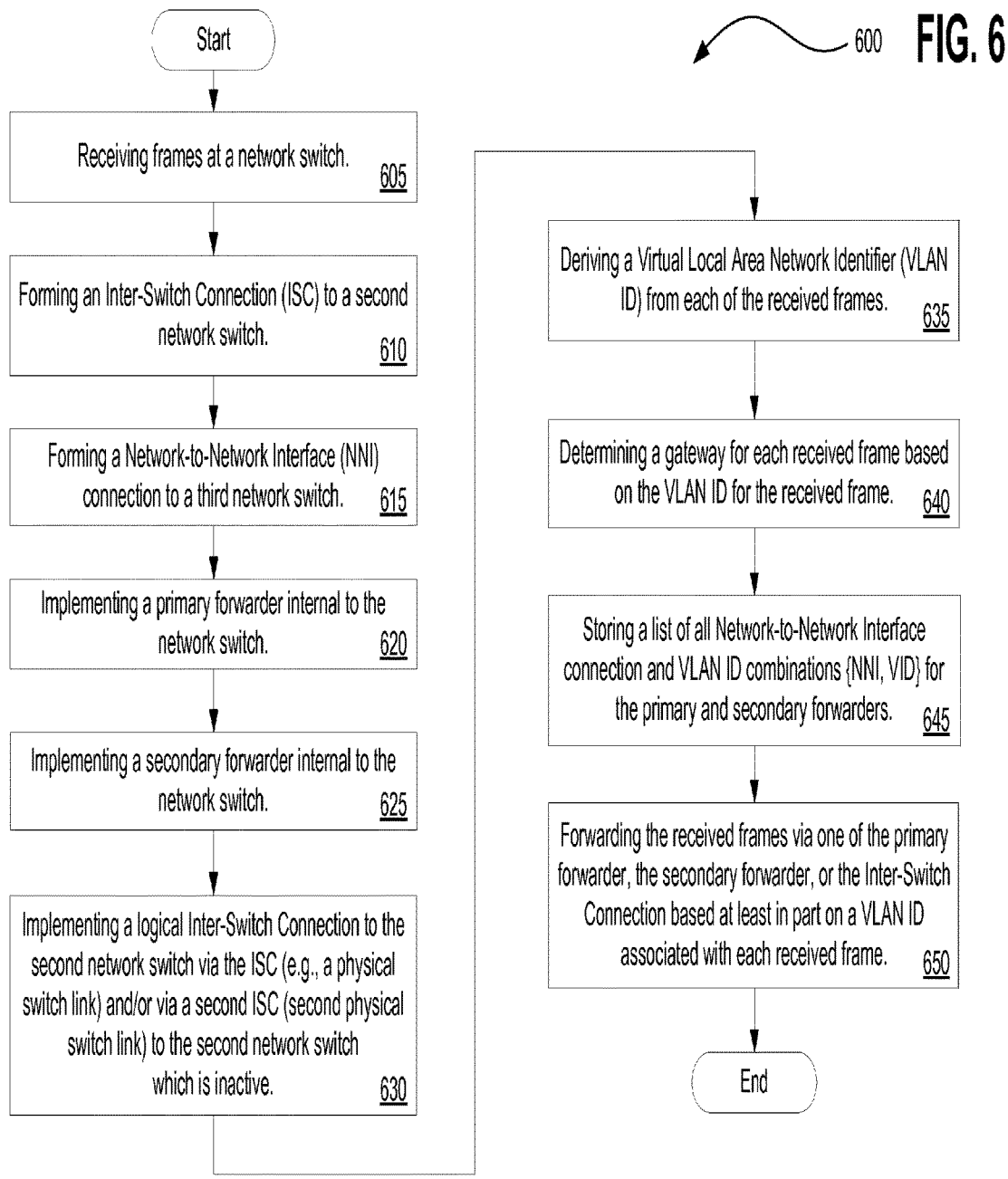

FORWARDING INTER-SWITCH CONNECTION (ISC) FRAMES IN A NETWORK-TO-NETWORK INTERCONNECT TOPOLOGY

CLAIM OF PRIORITY

This application is a continuation application of, and claims priority to, U.S. patent application Ser. No. 14/508,517, filed Oct. 7, 2014, which is a continuation of, and claims priority to, U.S. Utility application Ser. No. 13/220,516, filed on Aug. 29, 2011, which claims priority benefit under 35 U.S.C. § 119(e) to U.S. Provisional Application No. 61/451,515, filed on Mar. 10, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of networking, and more particularly, to methods, systems, and apparatus for forwarding Inter-Switch Connection (ISC) frames in a Network-to-Network Interconnect (NNI) topology.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to claimed embodiments.

A Network-Network Interconnect (NNI) is a connection between two network domains, each operated independently under different network management and administration. Sometimes the term NNI is used exclusively for interconnections between two different service provider networks, and the term User-Network Interface (UNI) is used for interconnections between a customer or subscriber and a service provider network. This document makes reference to the term NNI to include both cases.

Maintaining high availability of an NNI is of paramount importance to network operators. So as to maximize availability (e.g., uptime, fault tolerance, etc.), NNIs are sometimes constructed using redundant nodes (such as switches or bridges) and redundant links, so that the NNI is capable of withstanding a failure of either a node or a link. In other instances, a network operator may use a same set of nodes to create NNIs to two or more other networks, thus having shared nodes (e.g., overlapping nodes or nodes that are common to more than one NNI) in the construction of an NNI in order to improve the resilience and fault tolerant capabilities of the constructed NNI.

Routing and forwarding problems arise when implementing NNI network topologies for connecting distinct networks (e.g., disparate network providers, user networks, and/or network operators). For example, depending on the chosen implementation, it may be required that an ISC link be active on a particular network, a requirement that may be in conflict with a network operator's own requirements or chosen topology. Alternatively, it may be necessary to "tag" incoming and outgoing frames, identifying the frame as being associated with local traffic or with a specific NNI (e.g., by "tagging" or "encapsulating" the frames), however, as is well understood by those having skill in the art, any tagging or frame encapsulation scheme either creates a significant network bottleneck or requires costly dedicated hardware solutions capable of performing the tagging or frame encapsulation scheme with enough speed to obviate the bottleneck. For these reasons, tagging and/or frame encapsulation schemes are sometimes undesirable.

Improved mechanisms for forwarding networking frames (e.g., packets) within a network topology having one or more Network-to-Network Interconnects (NNIs) between separate and distinct networks (e.g., one or more NNIs between two or more networks having separate and distinct management and administration) is therefore desirable. Solutions to the above mentioned problems and other benefits of Applicants' disclosed embodiments are described in additional detail below.

BRIEF DESCRIPTION OF THE DRAWINGS

Embodiments are illustrated by way of example, and not by way of limitation and can be more fully understood with reference to the following detailed description when considered in connection with the figures in which:

FIGS. 1A, 1B, and 1C depict NNI topologies in accordance with which embodiments may operate;

FIGS. 2A and 2B illustrate redundant network switch nodes in accordance with which embodiments may operate;

FIGS. 3A, 3B, and 3C illustrate a model of multiple NNIs in accordance with which embodiments may operate;

FIGS. 4A and 4B illustrate overlapping NNIs or MLAG groups in accordance with which embodiments may operate;

FIGS. 5A and 5B illustrate exemplary architectures of a network switch in accordance with which embodiments may operate; and FIG. 6 is a flow diagram illustrating a method for implementing NNI topologies and forwarding inter-switch connection (ISC) frames in an NNI topology in accordance with disclosed embodiments.

DETAILED DESCRIPTION

Figure 1B:
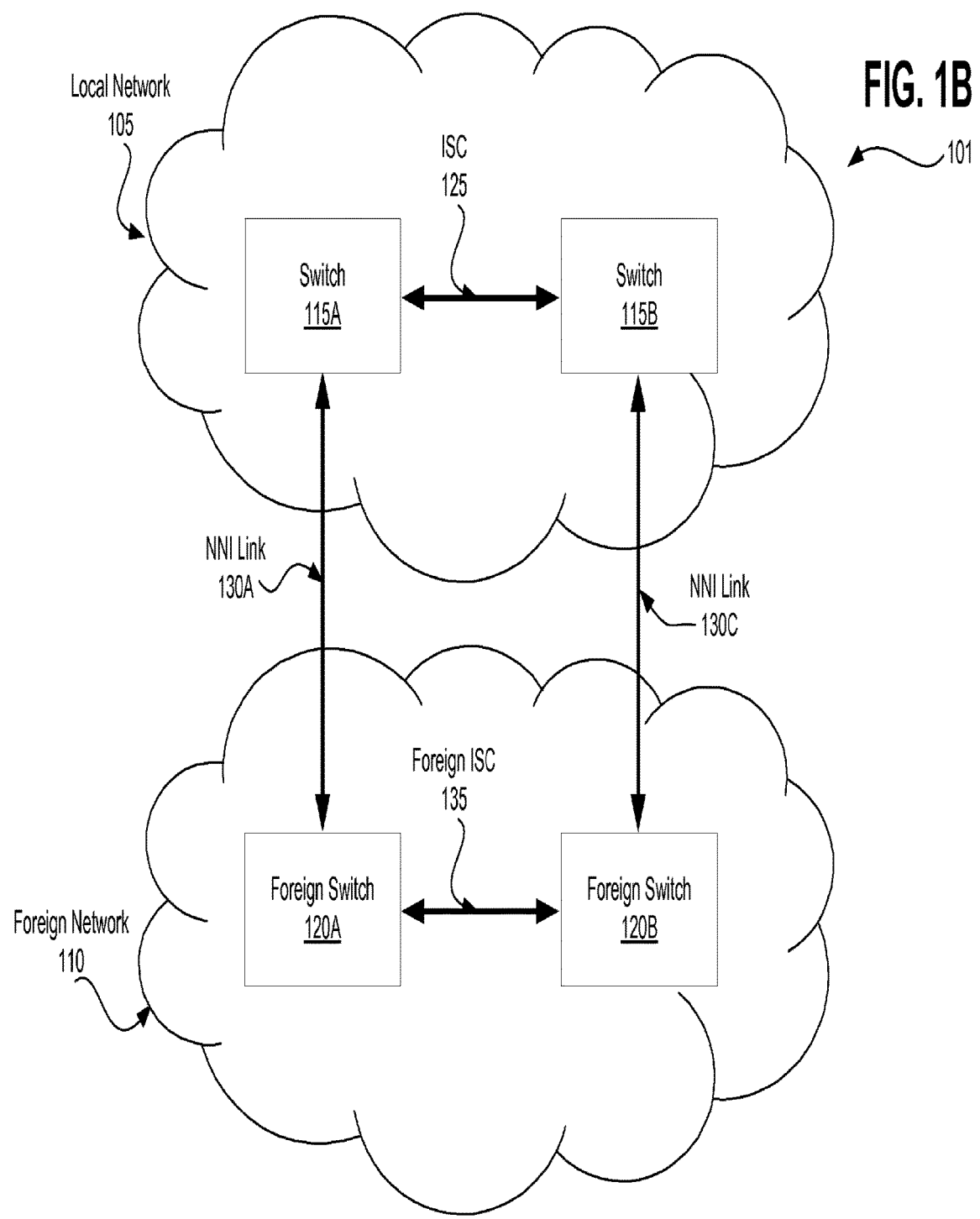

Described herein are systems, apparatuses, and methods for forwarding Inter-Switch Connection (ISC) frames in a Network-to-Network Interconnect (NNI) topology.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the above embodiments may be used alone or together with one another in any combination. Although various embodiments may have been partially motivated by deficiencies with conventional techniques and approaches, some of which are described or alluded to within the specification, such embodiments need not necessarily address or solve any of these deficiencies, but rather, may address only some of the deficiencies, address none of the deficiencies, or be directed toward different deficiencies and problems where are not directly discussed.

FIGS. 1A, 1B, and 1C depict NNI topologies 100, 101, and 102, in accordance with which embodiments may operate. These topologies are considered resilient because there are at least two possible paths from any node in the local network 105 to any node in the foreign network 110, These topologies are extendable by adding additional links in parallel with any of the links shown, or by adding additional nodes and interconnecting them in analogous manner.

Referring to FIG. 1A, the Inter-Switch Connection (ISC) 125 carries frames for the local network 105 and for any number of NNIs. For example, both NNI 130A and resilient NNI 130B are depicted, each of which may cause traffic to traverse the ISC 125 between switches 115A and 115B of the local network 105. NNIs 130A and 130B interface the local network 105A to the foreign network 110. Each of the NNIs 130A and 130B may interface the network elements of the local network 105 to, for example, a foreign switch 120 of the foreign network 110.

Referring to FIG. 1B, parallel NNI links are introduced to parallel or redundant foreign switching elements of the foreign network 110. Specifically, foreign switch 120A connects via NNI 130A to switch 115A and foreign switch 120B connects via NNI 130C to switch 115B, each of switches 115A and 115B operating within the local network 105 and each of foreign switches 120A and 120B operating within the foreign network 110. Foreign ISC 135 provides connectivity between the foreign switches 120A and 120B.

Referring to FIG. 1C, resilient NNIs are again introduced, now forming a first resilient NNI 130E between switch 115B and foreign switch 120A and forming a second resilient NNI 130D between switch 115A and foreign switch 120B, the resilient NNIs 130D and 130E operable in parallel to provide redundancy between the network switching elements of the local network 105 and the foreign network 110 respectively.

The topologies 100, 101, and 102 as depicted by FIGS. 1A, 1B, and 1C additionally support Multi-system Link Aggregation (MLAG). In accordance with one embodiment, the ISC 125 to carries frames for the local network 105 and carries frames for any number of MLAG groups. One distinction between the NNI applications and the MLAG applications is that the NNI is assumed to connect nodes in two independently administered and operated networks (e.g., such as, within both local network 105 and foreign network 110), whereas with the MLAG applications, such nodes may reside entirely within the same network (e.g., within either local network 105 or alternatively, within foreign network 110). A consequence of this distinction that is an NNI type application introduces some additional constraints on how frames are assigned to links within the NNI or MLAG.

In the following description of the embodiments, resilient collections of nodes and links will generally be referred to as an NNI, but it is understood that the same collection could be referred to as a MLAG group unless specified otherwise. The solutions described herein are also applicable to two or more NNIs corresponding to separate and distinct networks which are under common management (e.g., as opposed to separate management and administration), as well as to single network topology configurations having multiple MLAG groups defined therein, as will be appreciated by those having skill in the art.

FIGS. 2A and 2B illustrate redundant network switch nodes 220, 225, 221, and 235 in accordance with which embodiments may operate. When analyzing methods, systems, and topologies (e.g., topologies 200 and 201) for forwarding frames across a resilient NNI (or MLAG group), it is useful to model the redundant nodes 220, 225, 221, and 235 within a network topology (200 and 201). In such a model and in accordance with disclosed embodiments, each switch 215A and 215B includes two logical switching elements, one that is considered part of the local network 105 and one that is considered part of the NNI. For example, with reference to switch 215A of the local network 105, node a 220 may be considered as part of the local network 105, where as node a' 225 may be considered part of the NNI, and thus, not viewable or addressable as an independent node within the local network 105. Node a' 225 may correspond to a logically implemented node, for example, implemented via switch logic of switch 215A.

Alternatively, two physical nodes may be utilized in place of logical switching elements. For example, a physical "node a" within the local network 105 and a second physical node, "node a' (a prime)" as part of the NNI. Exemplary embodiments set forth herein describe how ISCs carry frames for the local network 105 and multiple NNIs via explanatory models for the internal switching functions of NNI nodes and additionally describe constraints on the flow of packets (e.g., frames) across the NNIs and through the local network 105 as well as the flow of packets or frames through the various NNI nodes.

Referring to FIG. 2A, node a 220 and node b 221 represent the logical switching elements of switches 215A and 215B respectively. Switches 215A and 215B are responsible for switching frames between all ports of the local network 105 and an internal logical connection to the NNI switching elements. The circles labeled node a' 225 and node b' 235 ("a prime" and "b prime" respectively) represent the logical switching elements responsible for switching frames between the links of the NNI and the internal logical connection to the local network 105 switching element. As depicted at FIG. 2A, the Inter-Switch Connection has been split into two logical connections, a first logical connection which is labeled ISC 240 between the local network 105 switching elements node a 220 and node b 221, and a second logical connection labeled ISC' 245 (ISC prime) between the NNI switching elements node a' 225 and node b' 235 accordingly. In this embodiment, each of ISC 240 and ISC' 245 traverse a physical switch link 205 between the two switches 215A and 215B (e.g., a hard-line connection between a physical port of each respective switch).

When ISC 240 is part of the active topology of the local network 105, (e.g., when it has not been blocked by a loop prevention protocol) the ISC 240 carries frames for the local network 105 and it is not necessary to use the ISC' 245 to carry frames for the NNI.

Alternatively, when the ISC 240 is not part of the active topology of the local network 105 (e.g., when it has been blocked by a loop prevention protocol), the ISC does not carry frames for the local network 105, but instead, it is necessary to use ISC' 245 to carry frames for the NNI.

When ISC 240 is not part of the active topology, node a 220 and node b 221 on each side of the ISC 240 must be aware that the ISC 240 is blocked. In some embodiments, an extension to a loop prevention protocol (e.g., RSTP or Rapid Spanning Tree Protocol) may be required to make the nodes "aware" or capable of discerning that the ISC 240 is blocked and not part of the active topology for the local network 105.

It is therefore possible, in accordance with one embodiment, to share a single physical link (e.g., the single physical link 205 between switches 215A and 215B) for both the ISC 240 and ISC' 245 without tagging or otherwise encapsulating received frames requiring forwarding, since both ISC 240 and ISC' 245 are not required to carry frames at the same time. Such frames requiring forwarding may arrive from within local network 105, or from within one or more foreign networks 210, for example, via NNI x1 230A or NNI x2 230B.

Mechanisms for sharing of a physical link are described in additional detail below. For example, in accordance with disclosed embodiments, a physical ISC link (depicted here as the single physical switch link 205 between switches 215A and 215B) is used to carry frames for both the local network 105 and the NNI, including packets arriving from or destined for the one or more foreign networks 210.

In accordance with one embodiment, any given NNI (or MLAG group) based frame must be delivered across the NNI only once and no more. In terms of the topology 200 set forth at FIG. 2A, this means that any frame may be forwarded over the internal connection of switch 215A from node a 220 to node a' 225 or may be forwarded over the internal connection of switch 215B from node b 221 to node b' 235, but not both. Stated differently, a single received frame may not traverse both the node a 220 to node a' 225 internal link and the node b 221 to node b' 235 internal link as such violates the restriction that a frame must be delivered across the NNI only once, and no more.

With reference to the topology 201 of FIG. 2B specifically, frames may be forwarded over the internal connection of switch 215A from node a 220 to one of node a' 225A or node a" (node a double-prime) 225B, or alternatively, the frames may be forwarded over the internal connection of switch 215B from node b 221 to one of node b' 235A or node b" (node b double-prime) 235B, but the same frames may not be forwarded over the internal connections of both switches 215A and 215B as doing so again violates the restriction that any given frame must be delivered across the NNI only once, and no more.

As described above, delivering frames "across the NNI" is in reference to frames traversing the internal connections of the respective switches 215A and 215B as described in the immediately preceding two examples for FIGS. 2A and 2B. Thus, nodes a and b (220 and 221) may be considered part of the active network topology of the local network 105, where as the internally connected logical nodes (e.g., a' and a" denoted 225A to 225B and b' and b" denoted 235A to 235B) are part of the NNI.

As set forth at FIG. 2B, in addition to the ISC 240 connecting node a 220 with node b 221 and the ISC' 245 connecting node a' 225A with node b' 235A, an additional ISC" (ISC double prime) 250 connects node a" 225B with node b" 235B. Several NNI interfaces are further depicted providing communication paths to the one or more foreign networks 210, including NNI x1 230A from node a' 225A, NNI y1 230C from node a" 225B, NNI x2 230B from node b' 235A, and NNI y2 230D from node b" 235B.

In accordance with one embodiment, a gateway check is performed before sending a frame over the internal connection (e.g., the node a 220 to node a' 225 internal link or the node b 221 to node b' 235 internal link). In alternative embodiments, the gateway check is performed after the frame is sent over the internal connection (e.g., a to a' or b to b') of the respective switch 215A or 215B, for example, by performing the gateway check at a Primary Forwarder as described in additional detail below. In such an embodiment, where frames are going from node a 220 to PFa' (primary forwarder a') or from going from node b 221 to PFb' (primary forwarder b'), the gateway check is performed subsequent to sending the frame over the internal connection.

Selecting which of the logical connections will be used for a given frame is referred to as the "gateway" selection, where either node a 220 of switch 215A or node b 221 of switch 215B is considered the "gateway" for that particular frame. The constraints on which node (220 or 221) can be the gateway for a particular frame depend upon whether or not the logical connection between switching elements for switches 215A and 215B are part of the active topology of the local network 105. In one embodiment, the active topology includes all connections that have not been blocked by a loop prevention algorithm such as a Spanning Tree Protocol (STP) or G.8032. For example, nodes a and b 220 and 221 may be active or visible on the local network 105 topology, whereas nodes a', a", b', and b" (225A, 225B, 235A, and 235B corresponding to a prime, a double-prime, b prime and b double prime respectively) may be inactive or not visible, on the local network 105 topology, stated differently, they are not part of an active topology of the local network 105, within which switching elements (e.g., nodes a and b) operate.

When the ISC is not part of the active topology of the local network 105 (e.g., when it is blocked by a loop prevention protocol), there is another path through the local network 105 between "node a" and "node b." In this circumstance, the gateway selection is determined by the Virtual Local Area Network Identifier ("VLAN ID" or "VID") of the frame in the local network 105. Thus, in accordance with one embodiment, all frames with the same VID use the same gateway (e.g., either node a 220 operating as a first gateway or node b 221 operating as a second gateway). Through the practice of such an embodiment, certain problems are avoided as follows.

First, making the gateway selection based on VID prevents thrashing during the learning process of other nodes within the local network 105. When the ISC 240 is not part of the active topology, broadcast frames received from the NNI (e.g., via NNI x1 230A) over the internal connection a' 225A to node a 220 will be forwarded along a path through the local network 105 and arrive at node b 221. Likewise broadcast frames received from the NNI (e.g., NNI x2 230B) over the internal connection node b' 235A to node b 221 will be forwarded along the same path through the local network 105, but in the reverse direction, to arrive at node a 220.

In such an embodiment, all nodes along the path learn the direction of travel for each MAC-SAND combination, where each MAC-SA/VID combination corresponds to a Media Access Control address (MAC address) and/or Service Identifier (SID) for a given frame. To prevent thrashing during the learning process, for any frames with the same MAC-SA/VID combination which are traveling in arbitrary directions along the path, a gateway selection (either node a' 225A to node a 220 or node b' 235A to node b 221) is made based on the MAC-SA, or based on the VID, or based on the particular MAC-SA/VID combination for that frame.

Secondly, making a gateway selection for a frame based on the VID prevents forwarding of any particular frame across the NNI twice, in violation of the above stated restriction that frames be delivered across the NNI only once and no more. For example, any broadcast frame sourced within the local network 105 will be forwarded to both nodes a and b simultaneously and thus, could potentially be forwarded across both the a-a' and b-b' internal links (e.g., internal connections node a' 225A to node a 220 or node b' 235A to node b 221) in violation of the single delivery restriction. Similarly, any broadcast frame received from the NNI (e.g., NNI x1 230A) and forwarded across the node a' 225A to node a 220 internal link will be forwarded through the local network 105 to node b 221 where it could potentially be forwarded again across the node b 221 to node b' 235A internal link, and vice versa, thus crossing or "being delivered" across the NNI more than once in violation of the restriction. Either such action (e.g., crossing the NNI more than once) results in the duplication of the frame, and therefore introduces processing inefficiency. Such frame duplication is prevented where there is a deterministic way of always selecting the same gateway (e.g., either node a 220 operating as a first gateway or node b 221 operating as a second gateway in the depicted topologies) for any given frame. Such a deterministic selection may be made based upon the MAC-SA or may be based upon other fields or additional fields in the frame. In one embodiment, the selection is based on a determined VID for the frame which is either read from a VID field in the frame or inferred/determined for the frame. Using the VID for the frame to select the gateway assures that the same frame will not be forwarded over both the a-a' and b-b' internal links (e.g., internal connections node a 220 to node a' 225A or node b 221 to node b' 235A) in violation of the single delivery restriction.

In accordance with one embodiment, when the ISC 240 is part of the active topology of the local network 105 (e.g., it is not blocked by a loop prevention protocol), then ISC 240 represents the only path between nodes a and b (220 and 221) in the local network 105. In such an embodiment, it is not necessary for a gateway selection for each frame to be based on any characteristic of the frame. In particular it is not necessary to assure that all frames with the same VID use the same gateway. The potential thrashing of the learning process described above will not occur because there is no path through the local network 105 between switching elements represented by nodes a and b (220 and 221) other than ISC 240 along which nodes could potentially see frames with the same MAC-SA/VID combination traveling in different directions. The potential duplication of frames described above (e.g., as with frames that are broadcast) can be prevented by making the gateway selection dependent upon the link selection, such that the selected link is attached to the same node that is selected as the gateway.

In accordance with disclosed embodiments, link selection includes determining which of the links in the NNI (or MLAG group), for example, the NNI x1 230A or the NNI x2 230B links depicted at FIG. 2A, will carry a given frame. Some deployments require that a specific link be used for frames with some common characteristic. For example, with NNI, it is typical for the operators of each network (e.g., each of the disparate local and foreign networks 105 and 210) to agree which link will carry frames for a given service, where each frame can be associated with a specific service by data fields within the frame. In some cases the service identifier is the VID, but in other cases the service could be determined by other fields such as an MIMS label or an I-SID (e.g., an 802.1ah I-component service ID which is a backbone service instance identifier defined in IEEE Std. 802.1ah-2008). When the ISC 240 is part of the active topology of the local network 105 and the deployment requires that a specific frame use a link attached to a specific node, making the gateway selection the same as the link selection will prevent frame duplication. Additionally, making the gateway selection the same as the link selection will cause frames received on the "wrong" link to be discarded when they are received at the node which is not the gateway, since the ISC' 245 is not available.

When the ISC 240 is part of the active topology of the local network 105, and the deployment does not require a specific frame to use a link attached to a specific node, frame duplication can be prevented by a gateway selection rule (e.g., selection of either node a 220 or node b 221) that stipulates any node receiving a frame on a link other than the ISC 240 is the gateway for that frame. Split Multi-Link Trunking (SMLT) implicitly utilizes such a rule, although such a rule is not explicitly defined with respect to such gateways.

In accordance with the embodiments as described with reference to FIG. 2A, only a single NNI is present (e.g., the depicted NNI having two NNI links, NNI x1 230A and NNI x2 230B). Additional embodiments set forth below describe how to use the same physical switch link 205 for multiple NNIs. For example, embodiments below make use of ISC' 245 providing a second logical path over the same physical switch link 205 as depicted by the figures. Different embodiments described with respect to FIGS. 3A, 3B, and 3C make use of two physical switch links 305 (e.g., in contrast to the single physical switch link 205 as depicted in the FIGS. 2A and 2B).

With reference again to FIG. 2B, a topology model 201 is extended to a second NNI with the introduction of NM y at FIG. 2B, in addition to NNI x which is depicted by FIG. 2A and remains at FIG. 2B.

NNI x uses links x1 and x2 (230A and 230B), additionally uses the logical switching elements a' 225A and b' 235A, and further uses the logical connection ISC' 245 between a' 225A and b' 235A.

NNI y uses links NNI y1 230C and NNI y2 230D, additionally uses the logical switching elements a" 225B and b" 235B (e.g., a double prime and b double prime respectively), and further uses the logical connection ISC" 250 (ISC double prime) between a" and b" (225B and 235B).

However, sharing a single physical switch link 205 for both ISC' 245 and ISC" 250 as is depicted by the topology 201 of FIG. 2B causes a loss of meta data (e.g., losing the frame of reference for the packet or frame) such that when a frame is received at node a 220 on the physical switch link 205, it is no longer possible to tell whether the frame should go to switching element a' 225A or a" 225B unless the frame is separately tagged or encapsulated with information or metadata that associates it with a particular NNI (e.g., with either NNI x or NNI y). For example, a frame that is supposed to travel a communications path from node b 221 to b' 235A then to a' 225A and finally to NNI x1 230A and on to the foreign network 210, would be indistinguishable from a frame that is supposed to travel a communication path from NNI y2 230D to b" 235B and then to a" 225B and finally to node a 220.

Nevertheless, it is sometimes preferable to wholly avoid encapsulation and tagging schemes. Therefore, additional embodiments set forth below describe how to obviate the need for encapsulation and/or tagging schemes to associate a frame with a particular NNI, in accordance with certain embodiments. However, a switch (e.g., 215A and/or 215B) may nevertheless utilize alternative encapsulation and/or tagging schemes for purposes unrelated to creating a resilient NNI where such alternative encapsulation and/or tagging schemes are not used to associate a received frame with a particular NNI.

Figure 3A:
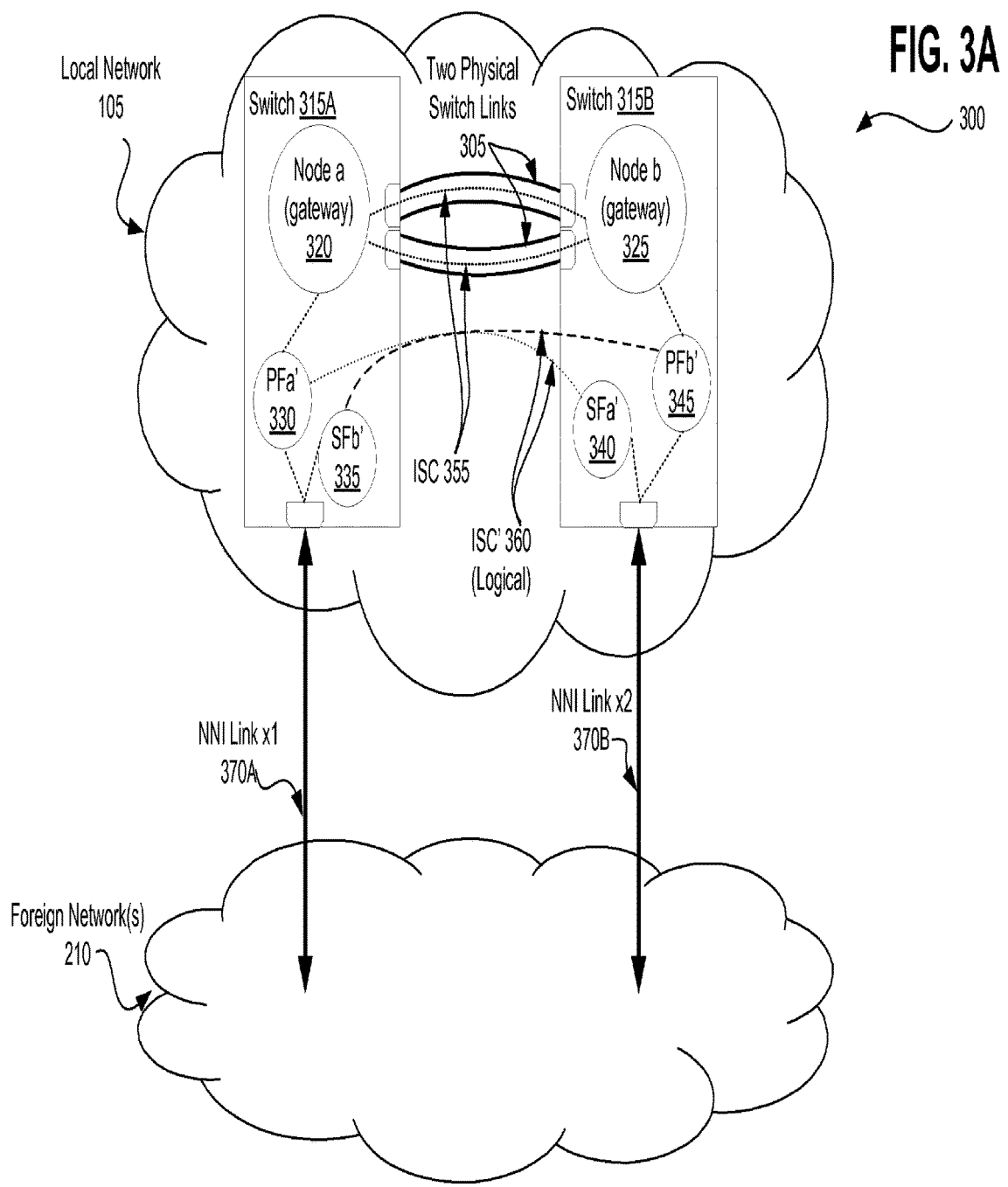

FIGS. 3A, 3B, and 3C illustrate a model of multiple NNIs in accordance with which embodiments may operate via topologies 300, 301, and 302.

The topologies 300 and 301 set forth at FIGS. 3A, 3B, and 3C show Inter-Switch Connections between switches 315A and 315B which consist of two physical switch links 305. For example, physical hard-line connections between physical ports of the first switch 315A and physical ports of the second switch 315B. Traversing the two physical switch links 305 are the ISCs, set forth here as two ISC 355 connections in FIGS. 3A and 3C and set forth as two logical ISC' 360 connections at FIGS. 3A, 3B, and 3C. The two connections for the local network 105 between switching elements gateway a 320 and gateway b 325 are labeled ISC 355, when present. The two logical connections for the NNI are labeled ISC' 360. In accordance with the disclosed embodiments, the logical connections ISC' 360 traverse the two physical switch links 305, but are depicted here separately simply for the sake of clarity and to make the ISC' 360 links more easily distinguishable.

In accordance with the disclosed embodiments, ISC 355 connections and logical ISC' 360 connections share the same pair of physical switch links 305 because both will not be required to carry frames at the same time. The behavior when the ISC 355 carries frames for the local network 105 is similar to the model as set forth at FIGS. 2A and 2B. Traffic (e.g., frames) may be sent along one of the physical links 305, or distributed between them using Link Aggregation or some similar load sharing technique. The distinction is when the logical ISC' 360 connection carries frames for the NNI. FIGS. 3A, 3B, and 3C differ from those of FIGS. 2A and 2B by separating the logical switching elements of a' and b' (225 and 235) for the NNI into Primary Forwarders (PFa' 330 and PFb' 345) and Secondary Forwarders (SFa' 340 and SFb' 335). Any frames that have node a (gateway a 320) selected as the gateway use the path through PFa' 330, whereas any frames that have node b (gateway b 325) selected as the gateway use the path though PFb' 345. In the topologies 300 and 301 of FIGS. 3A and 3B, the "node a" and "node b" of the respective switches are also referred to as "gateway a 320" and "gateway b 325" as they operate as gateways on behalf of the switches 315A and 315B respectively.

With reference to FIG. 3A, in accordance with one embodiment, a frame is received at the NNI link x1 370A. Its VID is checked or derived to determine whether "node a" 320 or "node b" 325 is the gateway for that frame. In some embodiments, the network topology 300 and NNI designates or carries the VID as an explicit field in the frame. In alternative embodiments, the VID is derived or determined from other fields in the frame, for example, from information or metadata associated with the frame or within a header for the frame. The method of determining the VID does not affect the operation of the disclosed embodiments, so long as the VID is determinable.

When the gateway is "node a" 320, the frame received at NNI link x1 370A (e.g., received at a port of switch 315A) is forwarded to Primary Forwarder a (PFa') 330 for gateway a 320 and then on to the logical switching element node a 320. Alternatively, when the gateway is "node b" 330 within switch 315B, the frame received at NNI link x1 370A within switch 315A is forwarded to the Secondary Forwarder b (SFb') 335 for gateway b 325, forwarded across the ISC' 360 to the Primary Forwarder b (PFb') 345 for gateway b 325, and to the logical switching element node b 325 within switch 315B.

With reference to FIG. 3B, in accordance with one embodiment, topology 301 of FIG. 3B extends to multiple NNIs and dedicates the two physical switch links 305 to supporting the ISC' logical connection 360. Therefore, the two physical switch links 305 of FIG. 3B are inactive and are not part of the active topology for the local network. The two physical switch links 305 support multiple resilient NNIs, each having resilient NNI links as depicted. For example, there are depicted two NNIs in topology 301: NNI x (e.g., links NNI x1 370A and NNI x2 370B) and NNI y (e.g., links NNI y1 370C and NNI y2 370D) are shown. All NNIs share the same Primary and Secondary Forwarders. In this embodiment, the Primary and Secondary Forwarders are responsible for forwarding frames between NNIs as well as between the local network 105 and the NNIs.

With reference to FIG. 3C, in accordance with one embodiment, topology 302 of FIG. 3B extends to multiple NNIs and further permits the two physical switch links 305 to operate either active upon the topology of the local network or inactive upon the topology of the local network. Stated differently, the two physical switch links 305 are not dedicated to supporting only the ISC' logical connection 360, but instead, may additionally support ISC 355 when the two physical switch links 305 are an active part of the topology of the local network.

In accordance with one embodiment, PFa' and SFa' (330 and 340) are each configured with a list of all {NNI, VID} combinations for which "node a" 320 is the gateway, and the link selection criteria for each NNI. Likewise PFb' and SFb' (345 and 335) are each configured with a list of all {NNI, VID} combinations for which "node b" 325 is the gateway, and the link selection criteria for each NNI. In accordance with one embodiment, a frame with a given VID may use different nodes as gateways to different NNIs.

In accordance with one embodiment, a frame is received at NNI link x1 370A (e.g., at a port of switch 315A). In such an embodiment, the VID of the received frame is checked to determine whether "node a" 320 or "node b" 330 is the gateway for the frame for NNI x. For example, the list of all {NNI, VID} combinations may be considered to make such a determination. The same considerations also apply to a frame received at NNI links x2 370B, y1 370C or y2 370D. Such an embodiment therefore presents several cases to consider. For example:

If the gateway for the frame received on NNI link x1 370A is "node a" 320, then the frame is forwarded to the Primary Forwarder a (PFa') 330 for gateway a 320. PFa' 330 will then forward the frame to the logical switching element a 320.

If node a 320 is not the gateway for the received frame on NNI y, then PFa' 330 does nothing further. A copy of the received frame is forwarded to the logical switching element a 320 and that copy of the received frame will propagate through the local network 105 to logical switching element b 325 at switch 315B and on to PFb' 345. Primary Forwarder b (PFb') 345 at switch 315B will determine that it is the gateway for frame received via NNI y, and depending on the link selection PFb' 345 will forward the frame either directly to NNI link y2 370D or across the ISC' 360 to SFb' 335. If forwarded across the ISC' 360 to SFb' 335, then SFb' 335 will again check the VID to determine that "node b" 325 is the gateway for the received frame, and SFb' 335 will then forward the frame to NNI link y1 370C.

If node a 320 is also the gateway for a frame received on NNI link y1 370C at switch 315A, then PFa' 330 will also forward a copy of the frame to NNI y. It will either forward the frame directly to NNI link y1 370C or, if the link selected is NNI link y2 370D, then PFa' 330 will forward the received frame through the ISC' 360 to SFa' 340. When SFa' 340 receives the frame from the ISC' 360 it checks the VID and determines that node a 320 is the gateway for this frame for both NNI x and NNI y. It also determines that the links selected are NNI link x1 370A and NNI link y2 370D. Since the frame was received from the ISC' 360 it does not forward the frame back across the ISC' toward NNI link x1 370A, but it does forward the frame to NNI link y2 370D. Note that the copy of the frame that was forwarded by PFa' 330 to the logical switching element a 320 will be propagated through the local network 105 to the logical switching element b 325 and then to PFb' 345. PFb' 345 checks the VID and determines that node b 325 is not the gateway for the frame on either NNI x or NNI y, so it discards this copy of the frame.

If the gateway for the frame received at NNI link x1 370A is "node b" 325, then the frame is forwarded to the Secondary Forwarder (SFb') 335 for gateway b 325. SFb' 335 will forward the frame across the ISC' 360 to PFb' 345, which then forwards the frame to the local switching element b 325. Further actions of both SFb' 335 and PFb' 345 depend upon whether "node b" 325 is the gateway for the frame for NNI y.

If node b 325 is not the gateway for the frame received at NNI link x1 370A for NNI y, then neither SFb' 335 nor PFb' 345 take any further action with the frame. A copy of the frame will be propagated through the local network 105 to switching element a 320 and then to PFa' 330. Primary Forwarder a (PFa') 330 will determine that node a 320 is the gateway for the frame on NNI y, and depending on the link selected, PFa' 330 will forward the frame directly to NNI link y1 370C, or across the ISC' 360 to SFa' 340. Secondary Forwarder a (SFa') 340 will again check that node a 320 is the gateway for the frame, and further determine that the selected link is NNI link y2 370D, and then forward the frame to NNI link y2 370D accordingly.

If node b 325 is the gateway for the frame received at NNI link x1 370A for NNI y, then both SFb' 335 and PFb' 345 check the link selection criteria for this frame on NNI y. The result will be that either SFb' 335 forwards a copy of the frame to NNI link y1 370C, or PFb' 345 forwards a copy of the frame to NNI link y2 370D. A copy of the frame propagates from switching element b 325 through the local network 105 to switching element a 320 and to PFa' 330, but is discarded at PFa' 330, since node a 320 is not the gateway for the received frame for either NNI x or NNI y.

Another scenario to consider is a frame originating within local network 105 that is to be transmitted across the NNI to a foreign network 210. The ISC' 360 will be in use by the NNI because the ISC 355 will have been blocked by configuration or by a loop prevention protocol in the local network 105. Therefore, there must be some other path between node a 320 and node b 325 through the local network 105, as any frames originating within the local network 105 and containing a broadcast, multicast, or unknown unicast address may be forwarded to both nodes a and b (320 and 325). One of nodes a and b (320 and 325) will be the gateway for such frames. Frames with known unicast address (e.g., an address that has been learned by the network), will be forwarded only to the node that is the gateway for that frame. In either case the node that is the gateway for the frame will send the frame to the corresponding Primary Forwarder for the node (e.g., either PFa' 330 or PFb' 345).

For example, where node a 320 is the gateway, the frame will be forwarded to PFa' 330. In such an example, PFa' 330 will determine whether NNI link x1 370A and/or NNI link y1 370C are the selected links for that frame on NNI x and/or NNI y respectively, and if so, forward a copy of the frame to NNI link x1 370A and/or NNI link y1 370C accordingly. If both NNI link x1 370A and NNI link y1 370C are not the selected link for their respective NNIs, then PFa' 330 also forwards a copy of the frame across the ISC' 360 to SFa' 340. In an alternative embodiment, PFa' 330 is configured to always send a copy to SFa' 340. In such an alternative embodiment, this more simplistic rule results in less efficient use of bandwidth on the ISC links but is less complex to implement, allowing the implementer to determine which trade-off is preferable.

Continuing with the above example, SFa' 340 will determine whether link NNI link x1 370A and/or NNI link y1 370C are the selected links for that frame on NNI x and/or NNI y respectively, and if so, SFa' 340 will forward a copy of the frame to NNI link x1 370A and/or NNI link y1 370C accordingly. Otherwise SFa' 340 discards the frame.

In accordance with one embodiment, MLAG groups are accommodated similar to the NNIs as described above. In accordance with such embodiments, different constraints on the link selection criteria apply to the various applications which result in slightly different behavior of the Primary and Secondary Forwarders.

For example, in an NNI application, link selection is typically expected to be symmetric. That is, the same link is selected for all frames corresponding to a given "service" (as sold by a service provider to a customer or subscriber) in both directions. The operators on both sides of the NNI agree on the link selection criteria and which link is to be used for each service (and which backup link is to be used in case of a link or node failure). Receipt of a frame on the "wrong" link of an NNI could result in forwarding that frame back across the NNI on the "correct" link as determined by the link selection criteria. Therefore when the Primary or Secondary Forwarder receives a frame on an NNI link, it checks the selection criteria and discards the frame if it was received on a link other than the link on which it would normally be transmitted. Conversely, an MLAG application typically does not require each side of the MLAG to agree on which link will be used for which frames, and therefore, it is not appropriate to determine if a frame is received on the "wrong" link. Forwarding a frame back across the same MLAG from which it was just received is therefore avoided by forwarding frames to the links of other NNIs only at the Primary Forwarder (PF) or Secondary Forwarder (SF) at which the frame was first received. Therefore, in accordance with one embodiment, an implementing rule requires that received frames sent across the ISC' 360 from a SF to a PF be forwarded by the PF only within the local network 105.

Figure 4B:
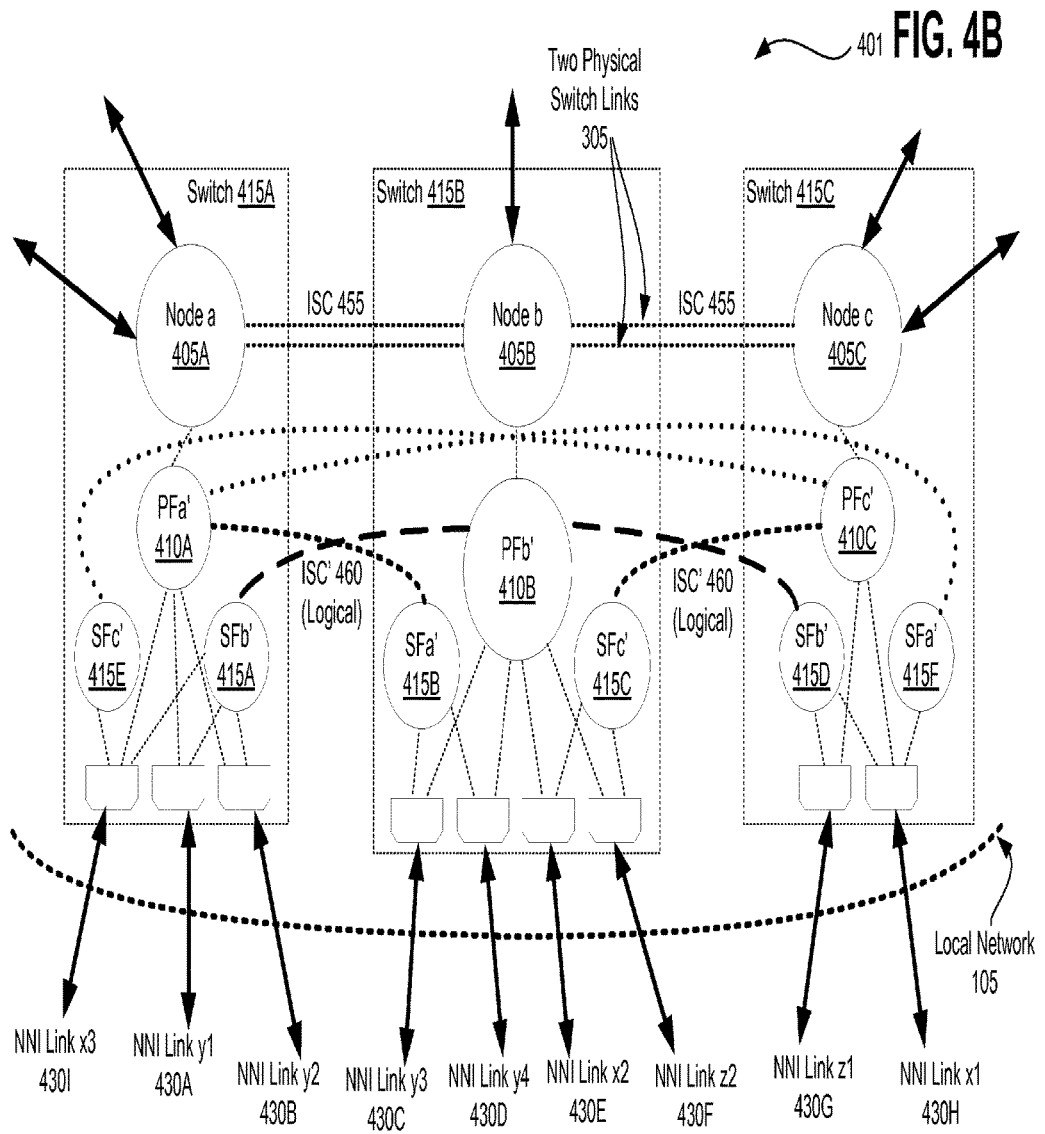

FIGS. 4A and 4B illustrate overlapping NNIs or MLAG groups in accordance with which embodiments may operate via the depicted topologies 400 and 401.

With reference to FIG. 4A, topology 400 shows how embodiments may be extended to overlapping NNIs or MLAG groups in which each node is the gateway to a single Primary Forwarder (e.g., PFa' 410A, PFb' 410B, and PFc' 410C), which is then connected via an ISC' 460 to a Secondary Forwarder (e.g., SFb' 415A in switch 415A, Secondary Forwarders SFa' 415 and SFc' 415C in switch 415B, and SFb' 415D in switch 415C) for each of the respective nodes (node a 405A, node b 405B, and node c 405C) corresponding to the respective switches 415A, 415B, and 415C. In accordance with such embodiments, the Primary Forwarders and Secondary Forwarders share links for any NNI. In this embodiment, three NNIs are depicted, specifically, NNI x (having links NNI x1 430H and NNI x2 430E), NNI y (having links NNI y1 430A, NNI y2 430B, NNI y3 430C, NNI y4 430D), and NNI z (having links NNI z1 430G and NNI z2 430F).

For example, the Primary Forwarder (PFb') 410B for node b 405B shares links for NNI x and NNI z with node c 405C, and shares links for NNI y with node a 405A. Therefore both node a 405A and node c 405C have Secondary Forwarders (SFb') 415A and 415D connected via an ISC' 460 to PFb' 410B. The Primary Forwarder in node c (PFc') 410C shares links for NNI x and NNI z with node b 405B, and therefore node b 405B has a Secondary Forwarder (SFc') 415C connected via an ISC' 460 to a PFc' 410C connection. The Primary Forwarder in node a (PFa') 410A shares links for NNI y with node b 405B, and therefore node b 405B also has a Secondary Forwarder (SFa') 415B connected via an ISC' 460 to PFa' 410A. The frame forwarding behavior for the Primary Forwarders and Secondary Forwarders is the same as previously described.

With reference to FIG. 4B, topology 401 shows how embodiments extend to NNIs or MLAG groups with more than two nodes per NNI per network. In such embodiments, all three nodes share links for NNI x (e.g., NNI link x1 430H, NNI link x2 430E, and NNI link x3 430I). Therefore each Primary Forwarder 410A-C is connected via an ISC' 460 to a Secondary Forwarder 415A-F in each of the other two nodes. As depicted, switch 415A having node 405A includes Secondary Forwarders SFc' 415E and SFb' 415A; switch 415b having node 405b includes Secondary Forwarders SFa' 415B and SFc' 415C; and switch 415C having node 405C includes Secondary Forwarders SFb' 415D and SFa' 415F. The frame forwarding behavior for the Primary Forwarders and Secondary Forwarders is the same as previously described.

The benefits of having a pair of physical links 305 for the ISC 455 has been described for case where the ISC 455 is not part of the active topology of the local network 105, leaving the ISC' 460 available to carry frames for the NNIs. There are additional benefits for the case where the ISC 455 is part of the active topology of the local network 105. Such benefits are as follows:

First, in the case where the deployment does not require a specific frame to use a link attached to a specific node 405A-C, a frame with a given MAC-SAND combination may be sent over a link attached to either node. On the receiving side this means that a frame with that MAC-SA/VID combination may be received at a node either directly or through the ISC 455. Such behavior complicates the MAC address learning process. One solution is to exchange address tables between the nodes 405A-C in a control protocol, rather than learning at the ISC 455. However, in an alternative embodiment having the two physical links 305 for the ISC 455, it is possible to distribute traffic between the physical switch links 305 such that all frames originating in the local network 105 are transmitted by a node 405A-C on one of the physical switch links 305, and all frames received from the NNI (or MLAG group) are transmitted by the node on the other remaining physical switch link 305. This allows the receiving node to separately learn addresses from the local network 105 (which are only reachable through the ISC 455) and learn addresses from the NNI (which are reachable through the ISC 455 or an NNI link attached to the respective node 405A-C). Such an embodiment eliminates the need to distribute address tables with a control protocol and may therefore be preferable for some implementations.

A second benefit applies to the case of a single NNI when the deployment requires a specific frame to use a link attached to a specific node. Preventing frame duplication typically requires the link selection criteria to be symmetric, so that a frame received on the "wrong" link can be detected and discarded rather than forwarding it across the ISC 455 and then sending it back across the NNI on the "correct" link. However, when two physical switch links 305 exist for the ISC 455 as shown, it is possible to distribute traffic between the two physical switch links such that all frames originating in the local network 105 are transmitted by a node on one of the two physical switch links, and all frames received from the NNI (or MLAG group) are transmitted by the node on the other one of the two physical switch links.

In accordance with one embodiment, a further implementing rule or restriction may be that frames received on the ISC 455 link carrying frames from the NNI will not be forwarded back to the NNI. Such a rule or restriction eliminates the requirement for the link selection to be symmetric. For example, each operator can independently select or determine which link will be used for which frames. Even when the link selection is symmetric, the receiving node 405A-C is allowed to forward frames received on the "wrong" link within the local network 105 and on the ISC 455 without duplicating the frame by sending it back across the NNI on the "correct" link.

In accordance with the disclosed embodiments, Split Multi-Link Trunking (SMLT), and a variety of similar technologies such as Multi-Switch (or Multi-Chassis or Distributed) Link Aggregation, are applied to a Resilient NNI. SMLT is also used in other circumstances where resilient connectivity is desired although not necessarily between two independently administered networks. SMLT has a similar issue in needing to use an ISC 455 to forward frames for the local network 105 and for one or more Split-Multi Link Trunks (or Distributed Link Aggregation Groups). The embodiments described above can also be applied to SMLT, and provide a superior solution for how to use the ISC 455 than that which is previously known.

Figure 5A:
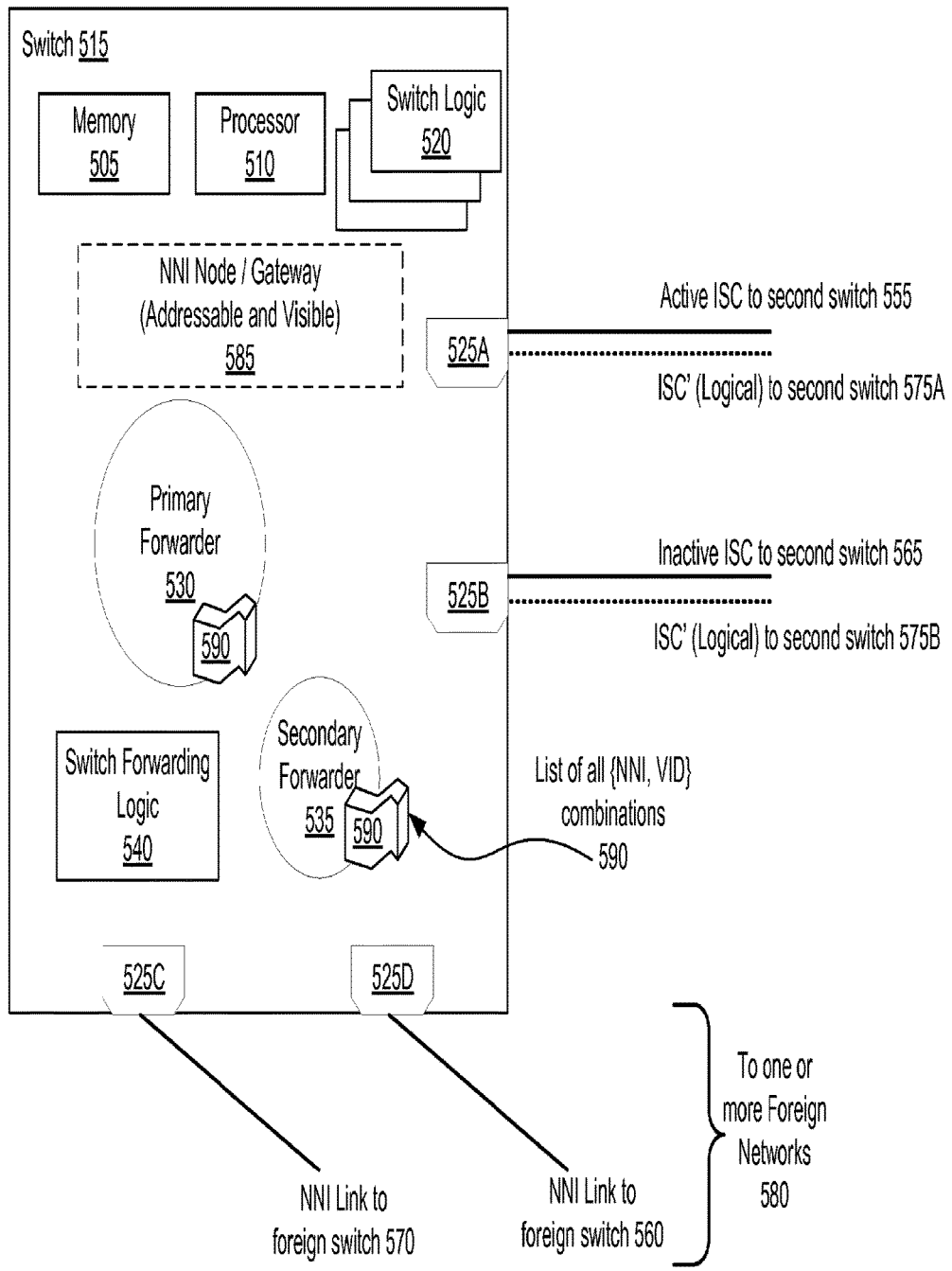

FIG. 5A illustrates an exemplary architecture 500 of a network switch 515 in accordance with which embodiments may operate. In accordance with one embodiment, such a network switch 515 includes a memory 505 to store switch logic 520 and a processor 510 to execute the switch logic 520, the switch logic representative of the various decisions, determinations, forwarding actions, and other a capabilities of the switches as described herein. Such a network switch 515 further includes a first physical switch port 525A to receive an Inter-Switch Connection (ISC) 555 from a second network switch. The second switch may operate within the same network as switch 515. Such an ISC 555 may be considered "active" on the local network 105, insomuch as it is not blocked by a loop prevention protocol or other blocking algorithm.

Network switch 515 further includes a second physical switch port 525C to receive a Network-to-Network Interface (NNI) 570 connection from a third network switch. The third network switch connected via NNI connection 570 may be a foreign switch operating within a foreign network.

Network switch 515 further includes first switch logic 520 to implement a primary forwarder 530 internal to the network switch 515 and second switch 520 logic to implement a secondary forwarder 535 internal to the network switch 515. Network switch 515 further includes third switch logic 520 or Switch Forwarding Logic 540 to forward received frames via one of the primary forwarder 530, the secondary forwarder 535, or the Inter-Switch Connection 555 based on a Virtual Local Area Network Identifier (VLAN ID) associated with the received frames.

In accordance with one embodiment, network switch 515 further includes fourth switch logic 520 to implement a logical Inter-Switch Connection 575A to the second network switch via the first physical switch port 525A.

In accordance with one embodiment, network switch 515 further includes a third physical switch port 525B to receive an inactive second Inter-Switch Connection 565 from the second network switch, and the inactive second Inter-Switch Connection 565 from the second network switch is not part of the active topology of a local network upon which the network switch 515 operates and further in which the first Inter-Switch Connection 555 from the second network switch is part of the active topology of the local network upon which the network switch operates. For example, inactive ISC 565 may be blocked by a loop prevention protocol whereas active ISC 555 is not blocked by the loop prevention protocol and is therefore active, addressable, and visible on the local network upon which network switch 515 operates. In such an embodiment, fourth switch logic 520 is further to implement a logical Inter-Switch Connection 575B to the second network switch via the third physical switch port 525B over the inactive second Inter-Switch Connection 565.

In accordance with one embodiment, the primary forwarder 530 internal to the network switch 515 is to communicably link to a secondary forwarder in the second network switch via a logical Inter-Switch Connection (e.g., 575A or 575B) between the network switch and the second network switch. In such an embodiment, the secondary forwarder 535 internal to the network switch 515 is to communicably link to a primary forwarder in the second network switch via the logical Inter-Switch Connection (e.g., 575A or 575B) to the second network switch. In such an embodiment, the second network switch may represent a redundant, resilient, or duplicate of the network switch 515, or may implement complementary and compatible functionality to operate cooperatively with network switch 515.

For example, in accordance with one embodiment, the network switch 515 and the second network switch operate within a local network as resilient and fail-over capable network switches cooperatively. In such an embodiment, the first Network-to-Network Interface connection 570 received via the network switch and the second Network-to-Network Interface connection physically coupled with the second network switch form resilient and fail-over capable Network-to-Network Interface connections to a foreign network, the foreign network to operate separate and distinct from the local network of the network switch and the second network switch.

In accordance with an alternative embodiment, the third network switch (e.g., coupled via NNI 570 with switch port 525C) operates within a first foreign network and a second Network-to-Network Interface connection physically coupled with the second network switch is received from a fourth network switch operating within a second foreign network, the first and second foreign networks each separate and distinct from one another (e.g., operated and managed by different entities, etc.). In such an alternative embodiment, both the first Network-to-Network Interface connection 570 received via the network switch 515 and the second Network-to-Network Interface connection physically coupled with the second network switch share the same primary and secondary forwarders 530 and 535 internal to the network switch 515 and share the primary and secondary forwarders in the second network switch.

In accordance with one embodiment, the first network switch 515 and the second network switch reside within a same local network and the third network switch accessible via the Network-to-Network Interface connection 570 resides within a foreign network which is operated independently from the local network under different network management and administration.

In accordance with one embodiment, the Network-to-Network Interface connection 570 forms a communication path between each of the local network and the foreign network operating as disparate networks.

In accordance with one embodiment, a second NNI connection 560 to a foreign network is connected with a fourth physical switch port 525D of the network switch 515. The NNI connections 560 and 570 may communicatively link the network switch 515 with foreign switches in one foreign network or may link the network switch 515 with foreign switches in different foreign networks (e.g., the same network switch may be linked with two or more foreign networks via NNI connections), as is set forth at element 580 depicting NNI connections leading to one or more foreign networks.

In accordance with one embodiment, the Network-to-Network Interface connection 570 received at the network switch 515 from the third network switch is accessible to the second network switch via the logical Inter-Switch Connection (e.g., 575A or 575B) to the second network switch.

In accordance with one embodiment, a second Network-to-Network Interface connection which is physically coupled with the second network switch is accessible to the network switch 515 via the logical Inter-Switch Connection (e.g., 575A or 575B) to the second network switch. In such an embodiment, both the first Network-to-Network Interface connections 570 received via the network switch 515 and the second Network-to-Network Interface connection physically coupled with the second network switch share the same primary and secondary forwarders 530 and 535 internal to the network switch 515 and share the primary and secondary forwarders in the second network switch.

In accordance with one embodiment, the network switch operates as a first NNI node or as a gateway 585 which is addressable and is visible within the network topology of the local network upon which the network switch 515 operates. In such an embodiment, the second network switch operates as a second NNI node or gateway. In such an embodiment, the third switch logic 520 or switch forwarding logic 540 which is to forward the received frames includes at least: a) switch forwarding logic 540 to forward any frames received via the Network-to-Network Interface connection 570, and using (or specifying) the first NNI node 585 as a gateway, via the primary forwarder 530 to the first NNI node 585 within the network switch 515, and b) switch logic to forward any frames received via the Network-to-Network Interface connection 570, and using (or specifying) the second NNI node as the gateway via the secondary forwarder 535, to the second NNI node within the second network switch.

In accordance with one embodiment, where the network switch 515 operates as a first NNI node 585 and the second network switch operates as a second NNI node, each of the primary and secondary forwarders 530 and 535 internal to the network switch 515 are configured with a list of all Network-to-Network Interface connection and VLAN ID combinations 590 (e.g., {NNI, VID} list 590) for which the first NNI node 585 is used as a gateway. In such an embodiment, each of the primary and secondary forwarders in the second network switch are similarly configured with a list of all Network-to-Network Interface connection and VLAN ID combinations for which the second NNI node is used as the gateway.

In accordance with one embodiment, the switch forwarding logic 540 is to determine a gateway (e.g., 585 of the network switch 515 or a gateway of the second switch) used by the received frames based on the VLAN ID as specified within a VLAN ID field of the received frames or based on a VLAN ID derived other fields and/or headers of the received frames.

In accordance with one embodiment, the switch forwarding logic 540 is to forward the received frames without tagging or encapsulating any of the received frames. Stated differently, the received frames are forwarded unchanged and unaltered as no tags or encapsulation layer(s) are required to associate a frame with a particular NNI.

In accordance with one embodiment, the Network-to-Network Interface connection 570 forms a communication path between each of the local network and the foreign network operating as disparate networks.

Embodiments further include systems utilizing two networks switches 515, each as depicted at FIG. 5A. In accordance with one embodiment, such a system includes a pair of Network-to-Network Interface switches (NNI switches) 515, each of the first NNI switch and the second NNI switch of the pair having a memory 505 to store switch logic 520 and a processor 510 to execute the switch logic 520. Such a system may be configured in accordance with the various topologies described above. For example, FIG. 2 depicts a system of such switches (corresponding to network switch 515 of FIG. 5A and denoted as switches 215A and 215B at FIG. 2A). In such a system, each switch includes an active Inter-Switch Connection 240 formed between the first NNI switch and the second NNI switch traversing a single physical switch link 205, the active Inter-Switch Connection 240 being part of an active topology of a local network upon which the network switch operates. Such a system further includes an inactive or logical Inter-Switch Connection (ISC') 245 formed between the first NNI switch and the second NNI switch, in which the inactive Inter-Switch Connection 245 is not part of the active topology of the local network upon which the network switches operate. Such a system of network switches 515 further includes a first Network-to-Network Interface connection formed between the first NNI switch and a first foreign switch, such as NNI x1 230A as depicted at FIG. 2A, and a second Network-to-Network Interface connection formed between the second NNI switch and a second foreign switch, such as NNI x2 230B as depicted at FIG. 2A. Such a system or network of switches 515 further includes first switch logic to implement a primary forwarder within each of the first NNI switch and the second NNI switch, such as primary forwarders PFa' 330 and PFb' 345 set forth at FIG. 3A. In such an embodiment, the system of switches 515 further includes second switch logic to implement a secondary forwarder within each of the first NNI switch and the second NNI switch such as secondary forwarders SFb' 335 and SFa' 340 set forth at FIG. 3A. The system of switches 515 further includes switch logic 520 or switch forwarding logic 540 to forward received frames via one of the primary forwarders, the secondary forwarders, or the Inter-Switch Connections based on a Virtual Local Area Network Identifier (VLAN ID) associated with the received frames.

In some embodiments, the system of switches 515 includes a first physical link between the first NNI switch and the second NNI switch and a second physical link between the first NNI switch and the second NNI switch, such as physical switch links 305 set forth at FIG. 3A and as shown at elements 555 and 565 of FIG. 5A. In such an embodiment, logical ISC connections may additionally be formed over one or both of the physical switch links as depicted at ISC' 360 of FIG. 3 and again at elements 575A and 575B of FIG. 5A. Other features as disclosed herein are compatible with such a system of switches.

FIG. 5B illustrates an exemplary architecture 501 of a network switch 515 in accordance with which embodiments may operate. In accordance with the disclosed embodiments, switch 515 may be enabled to perform the disclosed functions via a memory 505 to store, and a processor 510 to execute switch logic 520 as discussed above with respect to FIG. 5A. In alternative embodiments, switch 515 is enabled to perform the disclosed functions via a specialized integrated circuit 511A which is designed to perform the disclosed operations. For example, in one embodiment, a network switch 515 includes an integrated circuit (IC) 511A having a plurality of logic blocks 520 and switch forwarding logic 540, the logic capable to store and execute appropriate functions.

Further still, Integrated Circuit 511B is depicted as yet to be installed into a switch 515. Yet to be installed Integrated Circuit 511B nevertheless retains its plurality of logic blocks 520 and switch forwarding logic 540, the logic capable to store and execute appropriate functions as described above with regard to the IC 511A which is depicted as installed within switch 515.

For example, such an IC 511A and 511B may be designed as a System On a Chip (SOC) integrated circuit; designed as a Field-programmable Gate Array (FPGA) integrated circuit; designed as an Application-Specific Integrated Circuit (ASIC); or designed as a Programmable Logic Device (PLD) integrated circuit. The IC 511A and 511B may further include an input 512 and an output 513, each adapted to be physically coupled with a communications bus of the host switch, such as switch 515.

FIG. 6 is a flow diagram illustrating a method 600 for implementing NNI topologies and for forwarding inter-switch connection (ISC) frames in an NNI topology in accordance with disclosed embodiments. Method 600 may be performed by processing logic that may include hardware (e.g., circuitry, dedicated logic, programmable logic, microcode, etc.), software (e.g., instructions run on a processing device to perform various operations such receiving, forwarding, determining, processing, and transmitting traffic, frames, and data), or some combination thereof. Some of the blocks and/or operations listed below are optional in accordance with certain embodiments. The numbering of the blocks presented is for the sake of clarity and is not intended to prescribe an order of operations in which the various blocks must occur.

Method 600 begins with processing logic for receiving frames at a network switch. (block 605).

At block 610, processing logic within a switch forms an Inter-Switch Connection (ISC) to a second network switch and at block 615, processing logic within the switch forms a Network-to-Network Interface (NNI) connection to a third network switch.

At block 620, processing logic implements a primary forwarder internal to the network switch. Such a primary forwarder may be communicatively linked with a secondary forwarder located in a second switch, for example, over a logical ISC' connection traversing a physical switch link.

At block 625, processing logic of the network switch implements a secondary forwarder internal to the network switch. Such a secondary forwarder may be communicatively linked with a primary forwarder of a second switch, for example, via a logical ISC' connection.

At block 630, processing logic implements a logical Inter-Switch Connection to the second network switch via the ISC (e.g., via a physical switch link) and/or via a second ISC (e.g., via a second physical switch link) to the second network switch which is inactive.

At block 635, processing logic of the network switch derives a Virtual Local Area Network Identifier (VLAN ID) from each of the received frames and at block 640, processing logic of the network switch determines a gateway for each received frame based on the VLAN ID for the received frame.

At block 645, processing logic for the network switch stores or configures a list of all Network-to-Network Interface connection and VLAN ID combinations {NNI, VID} for each of the primary and secondary forwarders.

At block 650, processing logic of the network switch forwards the received frames via one of the primary forwarder, the secondary forwarder, or the Inter-Switch Connection based at least in part on a VLAN ID associated with each received frame. Received frames may additionally be forwarded via the NNI connection, for example, forwarding the frames to a foreign network.

The above disclosed embodiments overcome undesirable characteristics associated with other proposed solutions and implementations directed toward accommodating multiple NNIs For example, some of these undesirable characteristics of less desirable alternatives are described below with reference to the above disclosed embodiments as follows:

Firstly, dedicating an ISC to a single NNI (or "trunk" in SMLT nomenclature) is undesirable because in doing so, the dedicated ISC cannot be used to carry frames associated with local traffic of a local network, nor can multiple NNIs be supported by a dedicated ISC. The disadvantage of not being able to support multiple NNIs is limiting where multiple NNI support is desired. The disadvantage of not being able to carry frames associated with local traffic is a significant constraint on the topology of a local network 105, for example, eliminating the ability to use a simple ring topology.

Secondly, constructing an ISC with multiple links, each dedicated either to local traffic or to a single NNI creates the disadvantage of requiring m+1 links to support m NNIs. Through practice of the above disclosed embodiments, one fewer link will be required to support the same number of NNIs of a less desirable architecture having ISCs dedicated to ether local traffic or to a single NNI.

Thirdly, allowing an ISC to carry frames associated with local traffic and multiple NNIs, but modifying the frames by adding information that explicitly identifies the frame as associated with local traffic or with a specific NNI (e.g., through "tagging" or "encapsulating" the frames) presents a significant bottleneck to the network switching components and potentially incurs great expense as such tagging and encapsulation must be performed in hardware to avoid a significant drop in performance of the network. Implementing such a solution can be costly as improved networking components with greater processing capabilities are required to support the same level of network throughput, and thus, such a solution precludes the ability of being able to use existing network equipment to construct a resilient NNI (e.g., by upgrading firmware or software only to replace logical components for the respective hardware elements).

Fourthly, existing SMLT literature describes a mechanism to allow an ISC to carry frames associated with local traffic and multiple NNIs, but with the constraint that the ISC is always available to carry frames associated with local traffic. Thus, the ISC is always required to be part of the active topology of the local network 105, and cannot be blocked by a loop prevention algorithm such as a Spanning Tree Protocol (STP/RSTP/MSTP) or a resilient ring protocol (e.g. Ethernet Automatic Protection Switching (rfc3619 EAPS) or Ethernet Ring Protection Switching (ITU-T G.8032)). Such an approach is therefore incompatible with blocking and loop prevention protocols, which is once again limiting to the topology of the local network 105, or alternatively, would require modifications to such protocols to make them compatible. The existing SMLT mechanism leads to other constraints in which, for example, one node can only support one ISC, thus preventing topologies with overlapping NNIs (e.g., NNIs that share one node but not all nodes) and NNIs including more than two nodes in one network, the latter of which provides additional resiliency to the NNI, and is also important when maintaining a network to be able to add a new node before removing an old one without leaving the NNI unprotected at any given time. Practice of the above disclosed embodiments permit the implementation of blocking and loop prevention protocols and additionally permit a single node to support more than one ISC, thus enabling overlapping NNIs and NNIs with more than two nodes in a network, thus enhancing network resiliency.

Embodiments described herein accommodate an ISC that can carry frames associated with the local network 105 and with any number of NNIs (or any number of SMLT trunks or Link Aggregation Groups when used in a non-NNI circumstance), such that: (1) The ISC requires just two physical switch links to support any number of NNIs; (2) no modification of frames is required (e.g., tagging or encapsulation is expressly and intentionally avoided), thus allowing un-modified frames to be forwarded); (3) the ISC can be used as part of the local network 105 topology with no constraints on when an ISC may be included in the active topology or inactive/blocked by a loop prevention protocol; (4) the disclosed embodiments support overlapping NNIs; and (5) the disclosed embodiments support NNIs with more than two nodes in the local network 105.

Certain functionality described herein may be performed by hardwarized or hardware implemented logic units or modules. For example, a hardware based frame forwarder hardware based VID or SID determiner (e.g., such as a hardware multiplexer) configured with or within a CPU processor and accompanying memory of a networking device, network switch, and so forth, are in accordance with the embodiment described herein.

While embodiments have been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the invention is therefore determined in reference to the appended claims, along with the full scope of equivalents to which such claims are entitled.

What is claimed is:

1. A first network switch, comprising:
a first network switch element coupled to a physical switch link to transmit a first untagged and not encapsulated frame for a local network over a first logical connection of the physical switch link to a first network switch element of a second network switch coupled to the physical switch link, when the physical switch link is part of an active topology of the local network; and
a second network switch element coupled to the physical switch link to transmit a second untagged and not encapsulated frame for a foreign network over a second logical connection of the physical switch link to a second network switch element of the second network switch coupled to the physical switch link, when the physical switch link is not part of the active topology of the local network, wherein the first network switch element and the second network switch element are nodes within the active topology of the network for receiving frames; and
wherein the first network switch and the second network switch select a link for transmitting each received frame, wherein the selection is made dependent upon a gateway selection rule stipulating that any node receiving a frame on a link other than the first logical connection is designated as a gateway for that received frame, wherein the gateway selection rule is utilized when the physical switch link is part of the active topology upon which the first network switch operates and when the received frame is not associated with a pre-determined link selection.

2. The first network switch of claim 1, wherein, when the physical switch link is not part of the active topology of the local network, the first network switch element is configured to determine whether the physical switch link is blocked according to a loop prevention protocol.

3. The first network switch of claim 2, wherein the first network switch element and the second network switch element transmit their respective untagged and not encapsulated frames at different times.

4. The first network switch of claim 2, wherein the first network switch element of the first network switch is a node in the local network and wherein the second network switch element of the first network switch is a node in the foreign network.

5. The first network switch of claim 2, wherein the second network switch element is coupled to a third network switch via a connection consisting of one of:
a Network-to-Network Interface (NNI) connection; or
a Multi-system Link Aggregation (MLAG) connection.

6. The first network switch of claim 5, wherein the third network switch operates in the foreign network.

7. The first network switch of claim 6, wherein the connection coupling the second network switch element to the third network switch is a first connection, and wherein the second network switch is coupled to the foreign network via a second connection that does not include the first connection.

8. The first network switch of claim 2, wherein the first network switch further comprises:
memory to store instructions comprising switch forwarding logic; and
a processor to execute the instructions comprising switch forwarding logic.

9. The first network switch of claim 8, wherein the switch forwarding logic is configured to monitor whether the physical switch link is part of the active topology of the local network.

10. The first network switch of claim 2, wherein the first network switch is further configured to identify a Virtual Local Area Network Identifier (VLAN ID) related to the first untagged and not encapsulated frame.

11. The first network switch of claim 10, wherein the first network switch is configured to identify a network switch element based on the identified VLAN ID, wherein the second network switch element is configured to transmit the first untagged and not encapsulated frame to the identified network switch element.

12. The first network switch of claim 11, wherein the identified network switch element is the first network switch element.

13. The first network switch of claim 2, wherein the first network switch is configured to identify a Service Identifier related to the first untagged and not encapsulated frame.

14. The first network switch of claim 13, wherein the second network switch element is configured to select a link for transmitting each received frame based on a given service type, the given service type being designated by a field within each frame.

15. The first network switch of claim 2, wherein the second network switch element is configured to deterministically discard a received frame based on a data field in the received frame.

16. The first network switch of claim 2, wherein the first network switch is configured to transmit to the foreign network.

17. The first network switch of claim 2, wherein the physical switch link is part of the active topology upon which the first network switch operates when the physical switch link has not been blocked by a loop prevention algorithm; and wherein the physical switch link is not part of the active topology upon which the first network switch operates when the physical switch link has been blocked by a loop prevention algorithm.

18. The first network switch of claim 2, wherein the physical switch link is part of the active topology of the local network upon which the first network switch operates during receipt of a first set of received frames;

wherein the physical switch link is transitioned to not being part of the active topology of the local network upon which the first network switch operates responsive to a topology change for the local network; and wherein the physical switch link is not part of the active topology of the local network upon which the first network switch operates during receipt of a second set of received frames.

19. The first network switch of claim 18, wherein the first set of received frames and the second set of received frames are disjoint sets.

20. The first network switch of claim 2, wherein when the physical switch link is part of the active topology of the local network comprises when the first logical connection of the physical switch link is part of the active topology of the local network.

* * * * *

UNITED STATES PATENT AND TRADEMARK OFFICE
CERTIFICATE OF CORRECTION

PATENT NO. : 9,882,838 B2
APPLICATION NO. : 15/242633
DATED : January 30, 2018
INVENTOR(S) : Stephen R. Haddock Page 1 of 1

It is certified that error appears in the above-identified patent and that said Letters Patent is hereby corrected as shown below:

In the Claims

At Column 22, Claim 3, Line 18, change "claim 2" to --claim 1--.

At Column 22, Claim 4, Line 22, change "claim 2" to --claim 1--.

At Column 22, Claim 5, Line 27, change "claim 2" to --claim 1--.

At Column 22, Claim 8, Line 40, change "claim 2" to --claim 1--.

At Column 22, Claim 10, Line 50, change "claim 2" to --claim 1--.

At Column 22, Claim 13, Line 63, change "claim 2" to --claim 1--.

At Column 23, Claim 15, Line 4, change "claim 2" to --claim 1--.

At Column 23, Claim 16, Line 8, change "claim 2" to --claim 1--.

At Column 23, Claim 17, Line 11, change "claim 2" to --claim 1--.

At Column 23, Claim 18, Line 20, change "claim 2" to --claim 1--.

At Column 24, Claim 20, Line 15, change "claim 2" to --claim 1--.

Signed and Sealed this
Ninth Day of April, 2019

Andrei Iancu
*Director of the United States Patent and Trademark Office*